US008650022B2

(12) United States Patent
Boegl et al.

(10) Patent No.: US 8,650,022 B2
(45) Date of Patent: Feb. 11, 2014

(54) METHOD AND AN APPARATUS FOR AUTOMATIC SEMANTIC ANNOTATION OF A PROCESS MODEL

(75) Inventors: Andreas Boegl, St. Nikola (AT); Gustav Pomberger, Linz (AT); Michael Schrefl, Altenberg (AT); Norbert Weber, Glonn (DE)

(73) Assignee: Siemens Aktiengesellschaft, Munich (DE)

( * ) Notice: Subject to any disclaimer, the term of this patent is extended or adjusted under 35 U.S.C. 154(b) by 1042 days.

(21) Appl. No.: 12/322,706

(22) Filed: Feb. 5, 2009

(65) Prior Publication Data

US 2009/0234640 A1 Sep. 17, 2009

Related U.S. Application Data

(60) Provisional application No. 61/036,171, filed on Mar. 13, 2008.

(51) Int. Cl.
*G06F 17/20* (2006.01)
*G06N 5/02* (2006.01)

(52) U.S. Cl.
USPC .................. 704/9; 704/10; 706/55; 707/601; 707/794

(58) Field of Classification Search
USPC ........... 704/9, 10; 706/55; 707/601, 602, 604, 707/794
See application file for complete search history.

(56) References Cited

U.S. PATENT DOCUMENTS

| | | | | |
|---|---|---|---|---|
| 4,964,044 A * | 10/1990 | Kumano et al. | .................... | 704/6 |
| 5,471,611 A * | 11/1995 | McGregor | ...................... | 706/11 |
| 7,558,778 B2 * | 7/2009 | Carus et al. | | |
| 7,680,862 B2 * | 3/2010 | Chong et al. | .................. | 707/753 |
| 7,899,666 B2 * | 3/2011 | Varone | .............................. | 704/9 |
| 8,046,733 B2 * | 10/2011 | Weber | ........................... | 717/104 |
| 8,180,627 B2 * | 5/2012 | Bogl et al. | ........................ | 704/9 |
| 8,209,672 B2 * | 6/2012 | Ivanov | .......................... | 717/136 |
| 8,423,952 B2 * | 4/2013 | Bogl et al. | .................... | 717/105 |
| 2002/0046019 A1 * | 4/2002 | Verhagen et al. | ................. | 704/9 |
| 2006/0026203 A1 * | 2/2006 | Tan et al. | ................... | 707/104.1 |
| 2007/0239570 A1 * | 10/2007 | Kam-Chak Cheng et al. | . | 705/35 |
| 2007/0245297 A1 * | 10/2007 | Kuester et al. | ................ | 717/104 |
| 2008/0091405 A1 * | 4/2008 | Anisimovich et al. | ........... | 704/4 |
| 2008/0229275 A1 * | 9/2008 | Weber | ........................... | 717/104 |
| 2009/0113394 A1 * | 4/2009 | Weber et al. | .................. | 717/126 |
| 2009/0234640 A1 * | 9/2009 | Boegl et al. | ....................... | 704/9 |
| 2010/0004923 A1 * | 1/2010 | Bogl et al. | ........................ | 704/9 |
| 2010/0031240 A1 * | 2/2010 | Drumm et al. | ................ | 717/143 |
| 2010/0083215 A1 * | 4/2010 | Bogl et al. | .................... | 717/105 |
| 2010/0293451 A1 * | 11/2010 | Carus | ............................ | 715/230 |
| 2011/0153311 A1 * | 6/2011 | Bogl et al. | ........................ | 704/9 |

OTHER PUBLICATIONS

Assem et al: RDF/OWL Representation of WordNet; W3C Working Draft Jun. 19, 2006; http://www.w3.org/TR/2006/WD-wordnet-rdf-20060619/.

(Continued)

*Primary Examiner* — Martin Lerner

(57) ABSTRACT

An apparatus and a method for automated semantic annotation of a process model having model elements named by natural language expressions, wherein said apparatus comprises at least one semantic pattern analyzer which analyses the textual structure of each natural language expression on the basis of predefined semantic pattern descriptions to establish a semantic linkage between each model element to classes and instances of a reference process ontology for generating a semantically annotated process model.

15 Claims, 12 Drawing Sheets

(56) References Cited

OTHER PUBLICATIONS

Yan et al: BPMO: Semantic Business Process Modeling and WSMO Extension; International Conference on Web SErvices, Salt Lake City, USA, 2007, p. 1185-1186.

Basili et al: Language Learning and Ontology Engineering: an integrated model for the Semantic Web; 2nd Meaning Workshop, Trento, Italy, Feb. 2005.

Jörg Becker et al: Adaptive Reference Modeling: Integrating Configurative and Generic Adaptation Techniques for Information Models, In: Becker J.; Delfmann P. (Ed): Reference Modeling: Efficient Information Systems Design Through Reuse of Information Models, Physica, Heidelberg, 2007, p. 27-58.

Aldo Gangemi et al: Task Taxonomies for Knowledge Content D07, 2005; www.loacnr.it/Papers/D07_v21a.pdf, Sep. 13, 2007.

Martin Hepp et al: Semantic Business Process Management: A Vision Towards Using Semantic Web Services for Business Process Management, IEEE International Conference on e-Business Engineering, Beijing, China, 2005, p. 535-540.

Martin Hepp et al: Proceedings of the Workshop on Semantic Business Process and Product Lifecycle Management (SBPM 2007); in conjunction with the 3rd European Semantic Web Conference (ESWC 2007) Innsbruck, Austria, Jun. 7, 2007; http://sbpm2007.fzi.de/.

H Liu and P Singh: ConceptNet—a practical commonsense reasoning tool-kit; BT Technology Journal, vol. 22, No. 4, Oct. 2004, p. 211-226.

Jonathan Moore et al: Combining and Adapting Process Patterns for Flexible Workflow; 11th International Conference on Database and Expert Systems Applications, London, UK, 2000, p. 797-801.

Daniel Pfeiffer, Andreas Gehlert: A framework for comparing conceptual Models, Workshop on Enterprise Modelling and Information Systems Architectures, Klagenfurt, Austria 2005, p. 108-122.

Colette Rolland, Camille Ben Achour: Guiding the construction of textual use case specifications; CRI Université de Paris I Panthéon-Sorbonne, 17 rue de Tolbiac, 75013 Paris, France.

Michael Schermann et al: Fostering the Evaluation of Reference Models: Application and Extension of the Concept of IS Design Theories, 8th International Conference Wirtschaftsinformatik, Karlsruhe, Germany, 2007, p. 181-198.

Reinhard Schuette, Thomas Rotthowe: The Guidelines of Modeling—An Approach to Enhance the Quality in information Models, Conceptual Modeling—ER '98, 17th International ER-Conference, Singapore, Nov. 16-19, 1998. T.W. Ling, S. Ram, M.L. Lee (Eds.), p. 240-254, Berlin et al.

Oliver Thomas, Michael Fellmann: Semantic Business Process management: Ontology-Based Process Modeling Using Event-Driven Process Chains; IBIS—Interoperability in Business Information Systems—Issue 2 (1), 2007, p. 29-44.

\* cited by examiner

METHOD AND AN APPARATUS FOR AUTOMATIC SEMANTIC ANNOTATION OF A PROCESS MODEL

CROSS REFERENCE TO RELATED APPLICATIONS

This application claims the benefits of the provisional U.S. application 61/036,171 filed Mar. 13, 2008. The provisional U.S. application 61/036,171 is incorporated by reference herein in its entirety.

FIELD OF INVENTION

The invention relates to a method and an apparatus for automatic semantic annotation of a process model which comprises model elements named by natural language expressions.

TECHNICAL BACKGROUND

In organizations processes are described by comprehensive process designs. A business process is a set of coordinated activities, conducted by both humans and technical resources, with the objective to achieve a specific goal. Process designs are represented as process models in a particular modelling language, usually depicted by a graph of activities and their causal dependencies.

Besides a documentation of existing processes, the design of process models may have several, additional motivations that can be clustered into motivations that accomplish the organizational design or the development of information technology systems. Process descriptions support process design by enabling the identification of flaws in existing processes, by optimizing and by monitoring existing processes. Concerning the design of an IT-Infrastructure, process models play a vital role for the specification and configuration of software systems. Another important role denotes the usage for workflow management systems wherein process models specify executable workflows.

Hence, process models are input for semantic analysis activities that address organizational or information technology aspects. Semantic analysis activities comprise the comparison of process models, the calculation of process model metrics, the extraction of a common sense process vocabulary and queries on process models.

The comparison of process models is a semantic analysis activity which addresses the identification of similar or equal process activities in process descriptions. Model comparison can be used to specify a metric that defines a similarity measure between reference processes and organizational specific processes, for example. Reference processes describe common or best practice process solutions. Further, the comparison of process models enables to identify structural analogies in process models that may be an indicator for process patterns.

The calculation of process model metrics is performed to calculate model metrics which can be used to determine a process model quality by calculating a measure that determines the complexity. The model complexity can be defined by a number of logical connectors, a number of different activities, relationships between input and output objects, or a number of different roles associated with process activities.

In large organizations, the design of process models is realized by a number of process modelers. This implies a certain subjectivism concerning the naming of activities and information objects by using synonyms, not standardized abbreviations, for example.

Queries on process models enable answers to question such as:
Which activity is triggered by a certain event?
How is an activity decomposed into sub-processes?
Which roles are involved in a certain activity?
What is the required input, the delivered output of a process activity?
What are the preconditions necessary to perform a specific activity?

Such semantic analyses of process models can be conducted manually by human experts or can be performed automatically. Automated semantic analyses require a machine-readable process description with a formalized semantics of the model structure, the process elements and its descriptions.

One of the most popular process modelling language denotes the Event-driven Process Chain (EPC) modelling language. It has gained a broad acceptance and popularity both in research and in practice. An EPC Model is a directed and connected graph whose nodes are events, functions and logical connectors which are connected by control flow arcs. Functions represent the time and cost consuming elements by performing tasks on process objects (e.g. the task "Define" is performed on the Process Object "Software Requirements"). Each function has exactly one ingoing and one outgoing arc. Further, a function transforms a process object from an initial state into a resulting state captured by events that represent the passive elements. The state information is also bound to a text phrase (e.g. "Requirements Defined"). Each event has at most one ingoing and at most one outgoing arc. A connector can be either an AND-, an OR-, or an XOR-connector. A connector has multiple ingoing arcs and one outgoing arc (join), or it has one ingoing arc and multiple outgoing arcs (a split).

Conventional EPC model can be annotated as follows:
N is a set of nodes and $A \subseteq N \times N$ is a binary relation over N, the arcs. Each node $n \in N$ has a set of ingoing arcs
$n_{in} = \{(x,n)|(x,n) \in A\}$ and a set of outgoing arcs
$n_{out} = \{(x,y)|(x,y) \in A\}$.

An EPC Model is formally defined by a tuple M=(E, F, C, l, A, n, id) consisting of
three pairwise disjoint sets E (Event), F (Function), and C (Connector),
a mapping $l: C \rightarrow \{and, or, xor\}$ and
a binary relation of control flow arcs
$A \subseteq (E \cup F \cup C) \times (E \cup F \cup C)$ such that
$|e_{in}| \leq 1$ and $|e_{out}| \leq 1$ for each $e \in E$,
$|f_{in}| = |f_{out}| = 1$ for each $f \in F$, and
either $|c_{in}| > 1$ and $|c_{out}| = 1$ or $|c_{in}| = 1$ and $|c_{out}| > 1$ for each $c \in C$
a function $n: (E \cup F) \rightarrow$ String that is the name for an event or function
a function $id: (E \cup F) \rightarrow$ Integer that is a unique identifier for an event or function
The following sets of connectors are defined:
Split Connectors:
$\wedge C_{as} = \{c \in C | l(c) = and \wedge |c_{in}| = 1\}$
$\vee C_{os} = \{c \in C | l(c) = or \wedge |c_{in}| = 1\}$
$\times C_{xs} = \{c \in C | l(c) = xor \wedge |c_{in}| = 1\}$
Join connectors:
$\wedge C_{aj} = \{c \in C | l(c) = and \wedge |c_{out}| = 1\}$
$\vee C_{oj} = \{c \in C | l(c) = or \wedge |c_{out}| = 1\}$
$\times C_{xj} = \{c \in C | l(c) = xor \wedge |c_{out}| = 1\}$ Further, EPC models consider the following additional syntactical restrictions:
each EPC starts and ends with one or more events,
an EPC contains at least one function,
an EPC can be composed of several EPCs,
an event cannot be the predecessor or the successor of another event,
a function cannot be the predecessor or the successor of another function,
each OR-split and each XOR-split connector should be preceded by a function,
there should be no cycle of control flow that consist of connector nodes only.

FIG. 1 illustrates an example for a conventional EPC model. It consists of seven EPC-Events and five EPC-Functions whose control flow considers the following split connectors: one "or" one "and" and one "xor", and the following split connectors: one "and" and one "xor". The EPC-Function with the ID "03" is named with by the string "Define Software Requirements With Customer". Further, the model has two start events, namely "software Project Authorized" and "Customer Received". This means, that the succeeding functions will be executed if at least one or both of the two events occur. This logic is implied by the "or" join connector. The model concludes with the end event "Software Development Project Planned". This means that the described process achieves the state "Planned" for the process object "Software Development Project".

Using conventional EPC models for process descriptions as a basis for automatable semantic analysis activities faces one significant problem. EPC models are semi-formal process descriptions. This means that the implicit semantics of names for EPC-Functions and Events is bound to natural language expressions. The EPC modelling language suggests naming conventions or guidelines that specify the syntax for text clauses used for naming EPC-Functions and Events. Main objective of naming conventions is to specify syntactical rules that must be complied in order to reduce the subjectism of process modelers. Thus naming conventions care for a standardization regarding the naming of EPC-Functions and Events.

Hence, semantic analyses of EPC models require to resolve in a first step the meaning of names that can be understood by a computer. Resolving addresses the identification of relevant process information and its associated meaning implicitly captured by a name. To achieve a unique meaning of the names that describe EPC-Functions and Events, they can be semantically annotated. Semantic annotation links each EPC-Function and Event to entries of a process knowledge base that captures the semantics of used names.

As a further example "Define Software Requirements with Customer" is a possible name for an EPC-Function. This name consists of the task "Define" that is performed on the process object "Software Requirements". The process object "Software Requirements" is a specialization of the general process object "Requirements". The process object "Customer" indicates a parameter for that task, since this task is performed in a cooperate manner with a customer. If the name would be "Define Software Requirements for Customer" then the parameter has a different meaning since the customer indicates the target of the performed activity.

A conventional process for semantic annotation of EPC models neglects the implicit semantics of EPC functions and events.

It is an object of the present invention to provide a method and an apparatus for an automatic semantic annotation of a process model considering the implicit semantics of named process elements.

SUMMARY OF THE INVENTION

The invention provides a method for automatic semantic annotation of a process model which comprises model elements named by natural language expressions, wherein a textual structure of each natural language expression is analyzed on the basis of predefined semantic pattern descriptions to establish a semantic linkage between each model element to classes and instances of a reference process ontology for generation of a semantically annotated process model.

In a possible embodiment of the method according to the present invention, the reference process ontology is formed by a lexical knowledge base comprising a vocabulary used for model elements and a process knowledge base comprising process semantics of model elements.

In an embodiment of the method according to the present invention, the process model is formed by an EPC (Event Process Chain) model, an UML (Unified Model Language) model or a Petri-Network.

In an embodiment of the method according to the present invention, each semantic pattern description comprises a semantic pattern template of a model element, a set of template structures, and a set of analysis rules.

In an embodiment of the method according to the present invention the semantic pattern template is formed by a domain name and an ordered tuple of variables each pointing to a class of said process knowledge base within said reference process ontology and to an instance of said class.

In an embodiment of the method according to the present invention, an analysis rule is formed by a precondition which compares template structures with term structures extracted from natural language expressions and an operator that generates one or several instances of semantic pattern templates which are assigned to a model element of said process model.

In an embodiment of the method according to the present invention a named process element is a function provided for performing a task on a process object to transform said process object from an initial state to a resulting state or an event comprising a text clause.

In an embodiment of the method according to the present invention for each named model element for said process model a linguistic normalization of its natural language expression is performed by a term normaliser to generate a semantic label of said model element.

In an embodiment of the method according to the present invention a semantic pattern analysis of each generated semantic label is performed by a semantic pattern analyser to generate an ordered set of tuples containing instances of semantic pattern templates by using analysis rules of semantic pattern description.

In an embodiment of the method according to the present invention the instantiated semantic pattern templates are assigned to the respective model element to generate the semantically annotated process model.

In an embodiment of the method is performed by executing a computer program.

In an embodiment the computer program is loaded from a data carrier storing the computer program.

The invention further provides a method for automatic semantic annotation of a process model having model ele ments named by natural language expressions comprising the steps of:

performing a linguistic normalization of the natural language expressions to generate a semantic label for each named model element of said process model; and performing a semantic pattern analysis for each generated semantic label to establish a semantic linkage between each model element to classes and instances of a reference process ontology.

The invention further provides an apparatus for automated semantic annotation of a process model having model elements named by natural language expressions, wherein said apparatus comprises at least one semantic pattern analyser which analyses the textual structure of each natural language expression on the basis of predefined semantic pattern descriptions to establish a semantic linkage between each model element to classes and instances of a reference process ontology for generating a semantically annotated process model.

In a possible embodiment, the apparatus according to the present invention further comprises a term normaliser which performs the linguistic normalisation of said natural language expressions of said named model elements to generate a semantic label for each named model element of said process model.

In an embodiment of the apparatus according to the present invention, the apparatus further comprises a term normaliser which performs a linguistic normalisation of said natural language expression of said named model element to generate a semantic label for each named model element of said process model.

In an embodiment of the apparatus according to the present invention said apparatus further comprises a memory for storing said reference process ontology consisting of a lexical knowledge base comprising a vocabulary used for model elements and a process knowledge base comprising process semantics of model elements.

The invention further provides an apparatus for automating a semantic annotation of a process model having model elements named by natural language expressions comprising:

means for performing a linguistic normalisation of the natural language expression to generate a semantic label of the corresponding model element, and means for performing a semantic pattern analysis of said generated semantic label to generate an ordered set of tuples containing instances of semantic pattern templates using analysis rules of a semantic pattern description.

DESCRIPTION OF THE ENCLOSED FIGURES

DETAILED DESCRIPTION OF EMBODIMENTS

In the following, possible embodiments of the method apparatus for the automatic semantic annotation of a process model, in particular of an EPC process model, are described with reference to the enclosed figures.

Figure 1:
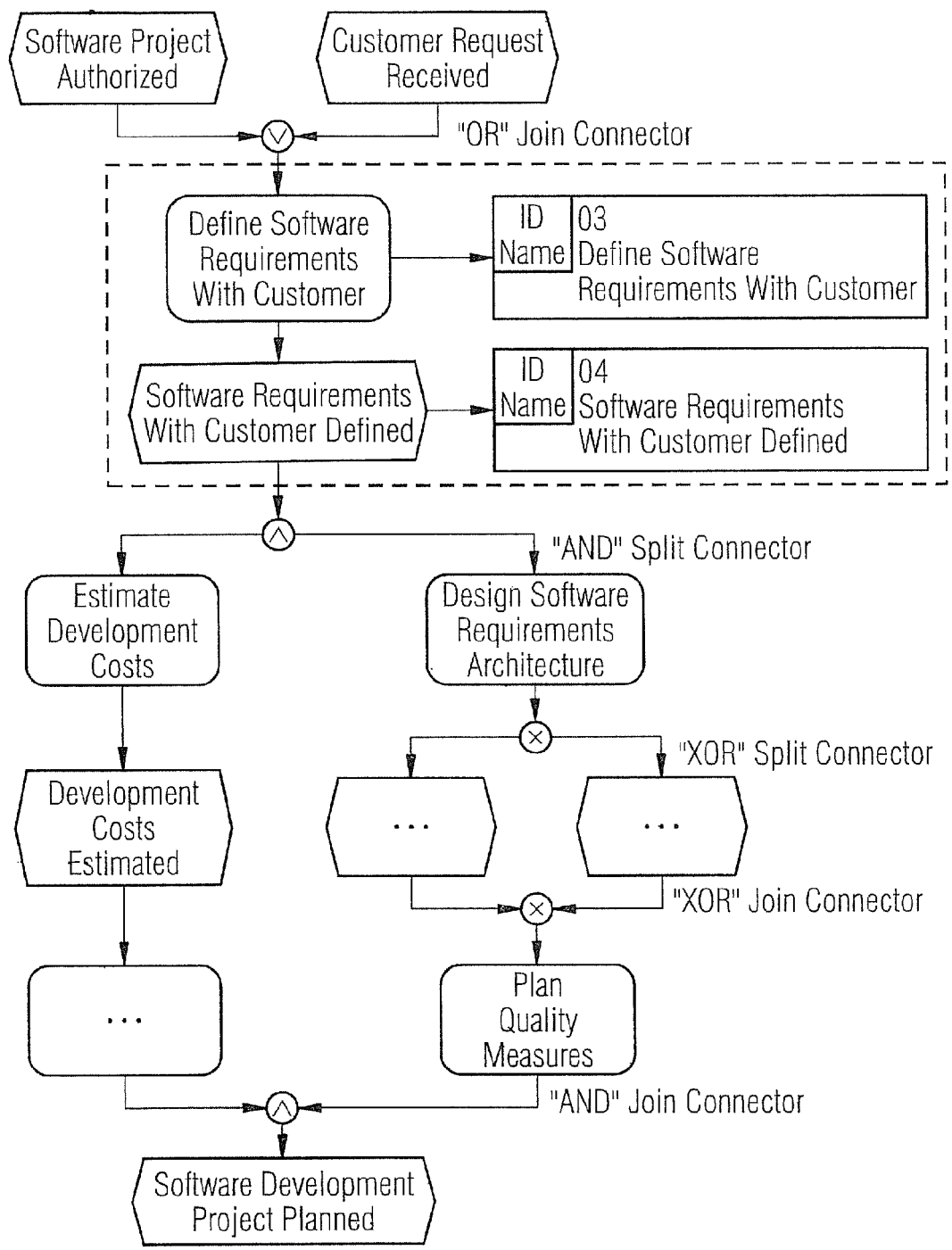
FIG. 1 shows an example of an conventional EPC model according to the state of the art.
Figure 2:
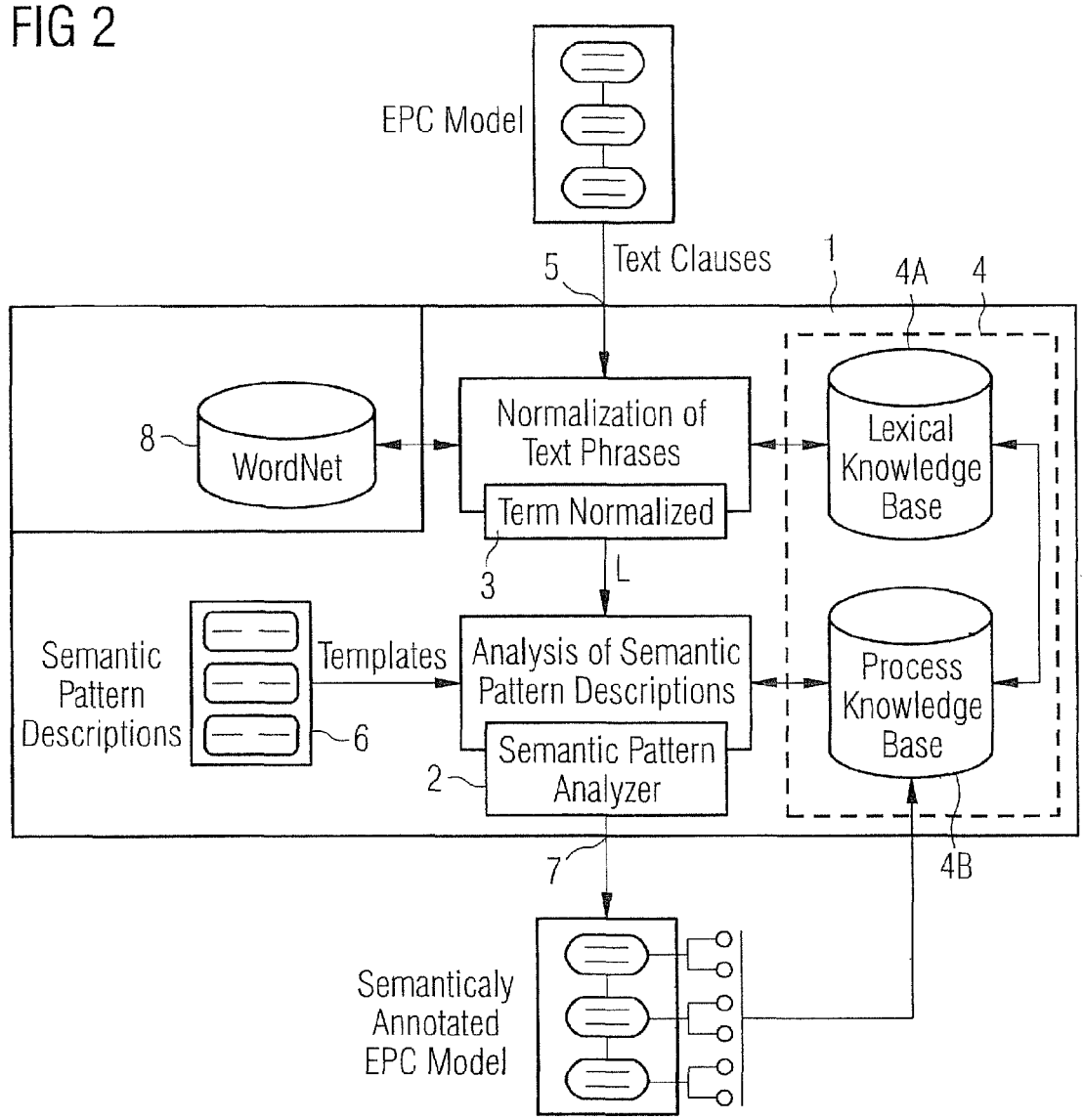
FIG. 2 shows a block diagram of an apparatus for automated semantic annotation as an exemplary embodiment of the present invention.

FIG. 2 shows a block diagram of an exemplary embodiment of an apparatus 1 for automated semantic annotation of a process model according to the present invention.

As can be seen in FIG. 2, the apparatus 1 comprises a semantic pattern analyser 2 which analyses the textual structure of a natural language expression on the basis of predefined semantic pattern descriptions to establish a semantic linkage between each model element of a process model to classes and instances of a reference process ontology for generating a semantically annotated process model. As can be seen from FIG. 2 the apparatus 1 further comprises a term normaliser 3 which performs a linguistic normalisation of natural language expressions of named model elements to generate a semantic label for each named model element of said process model. The apparatus 1 according to the embodiment shown in FIG. 2 further comprises a memory 4 for storing the reference process ontology consisting of a lexical knowledge base 4A comprising a vocabulary used for model elements and a process knowledge base 4B comprising process semantics of model elements.

As can be seen in FIG. 2 the apparatus 1 receives at an input interface 5 a process model such as an EPC model. The EPC model comprises model elements named by natural language expressions such as functions and events. The function can be provided for performing a task on a process object to transform the process object from an initial state to a resulting state. The functions or events within the EPC model comprise text clauses. For each named model element such as an event or a function of the process model the linguistic normalisation of its natural language expression is performed by the term normaliser 3 to generate a semantic label L of the respective model element. The term normaliser 3 forwards the label L to the semantic pattern analyser 2. The semantic pattern analyser 2 performs a semantic pattern analysis for each generated semantic label L to generate an ordered set of tuples containing instances of semantic pattern templates by using analysis rules of a semantic pattern description as shown in FIG. 2. Each semantic pattern description comprises a semantic pattern template of a model element a set of template structures and a set of analysis rules.

In a possible embodiment, a semantic pattern template is formed by a domain name and an ordered tuple of variables each pointing to a class of the process knowledge base 4B within the reference process ontology and to instance of the respective class.

In a possible embodiment the template structure is formed by a unique identifier and an ordered tuple of variables each pointing to a class of said process knowledge base 4B within the reference process ontology and to an instance of the respective class.

In a possible embodiment an analysis rule within the semantic pattern description 6 can be formed by a precondition which compares template structures with term structures extracted from natural language expressions and an operator that generates one or several instances of semantic pattern templates which are assigned to a model element of the process model.

As can be seen from FIG. 2 the apparatus 1 for automatic semantic annotation performs in a first step a linguistic normalisation of the natural language expressions to generate a semantic label L for each named model element of the process model and then performs a semantic pattern analysis in a second step for each generated semantic label L to establish a semantic linkage between each model element to classes and instances of the reference process ontology stored in the memory 4. The semantic pattern analyser 2 generates the ordered set of tuples containing instances of the semantic pattern templates by using analysis rules of the semantic pattern description 6. The instantiated semantic pattern templates are then assigned to the respective model elements to generate the semantically annotated process model which is output by the apparatus 1 via an output interface 7. In the embodiment shown in FIG. 2 the apparatus 1 processes an EPC model to generate a semantically annotated EPC model. In an alternative embodiment of the present invention the apparatus 1 can process a UML (Unified Model Language) model or a Petri-Network. The apparatus 1 according to the present invention as shown in FIG. 2 can process any kind of process model which comprises model elements named by natural language expressions, i.e. which comprises model elements including text clauses.

The method for a semantic annotation of model elements such as functions and events uses a reference ontology and semantic pattern descriptions. The reference ontology stored in memory 4 provides concepts and relations whose instances capture both the vocabulary (lexical knowledge) used to name Functions and Events and its process semantics (process knowledge). Thus, it serves as a common knowledge base for semantically annotated Functions and Events.

Lexical knowledge stored in the lexical knowledge base 4A comprises morphological and syntactic knowledge about used vocabulary. Morphological knowledge relates to word inflections such as single/plural form of a noun, past tense of verbs. Syntactic knowledge comprises word class information and binary features such as countable/uncountable. Additionally, the lexical knowledge base explicitly considers domain information and relationships such as is AcronymOf and is SynonymTo between entries. Domain information refers to application domains such as software or hardware development.

Process knowledge stored in the process knowledge base 4B represents the semantic domain for used names. The process semantics are expressed by instances of process ontology concepts such as task, process object and its semantic relationships such as is Part Of or is KindOf.

The semantic pattern descriptions 6 consist of template structures that bridge the gap between informal and formal representation. The informal representation refers to vocabulary used by names to describe EPC-Functions and Events, formal representation refer to concepts specified by a reference ontology. The semantic pattern descriptions 6 are either defined for EPC-Functions or for Events.

FIG. 2 depicts the overall architecture of a embodiment of an apparatus 1 for semantic annotation for EPC models. Text clauses are input for the term normaliser 3 that extracts terms and normalizes them by using the lexical knowledge base 4A. The semantic pattern analyzer 2 evaluates the structure of normalized terms against predefined naming conventions that are expressed formally by semantic pattern templates assigned to the semantic pattern descriptions 6. Thus the semantic linkage between names and entries of the knowledge base is realized by binding knowledge base entries to variables of a semantic pattern template.

The process knowledge base 4B captures the meaning respectively the process semantics of EPC-Functions and Events. Its structure is described by an ontology $O:=(C, \leq_c, R, \sigma)$ that specifies the concepts, relations and axioms for the process knowledge base.

An ontology is a structure $O:=(C, \leq_c, R, \sigma)$ consisting of
  two disjoint sets concepts (C) and relations (R) whose elements are called concepts and relations,
  a partial order $\leq_c$ on C, called concept hierarchy,
  a function $\sigma: R \rightarrow C \times C$, called signature, where $\sigma(r) = <\text{dom}(r), \text{ran}(r)>$ with $r \in R$, domain dom(r), and range ran(r), A partial order $\leq_c$ is defined as follows: if $c_1 <_c c_2$, for $c_1, c_2 \in C$, than $c_1$ is a subconcept of $c_2$, and $c_2$ is a superconcept of $c_1$. If $c_1 <_c c_2$ and there is no $c_3 \in C$ with $c_1 <_c c_3 <_c c_2$, then $c_1$ is a direct subconcept of $c_2$, and $c_2$ is a direct superconcept if $c_1$. This is denoted as $c_1 < c_2$.

The schema of the process knowledge base 4B is based on the semantic process elements EPC-Functions and Events. According to the EPC specification, an EPC-Function comprises one or more tasks that are executed on one or more process objects. A process object PO represents a central concept in process modelling. It represents something of interest within a process domain. A task can be performed manually or by a service automatically and can require one or more parameters.

Figure 3:
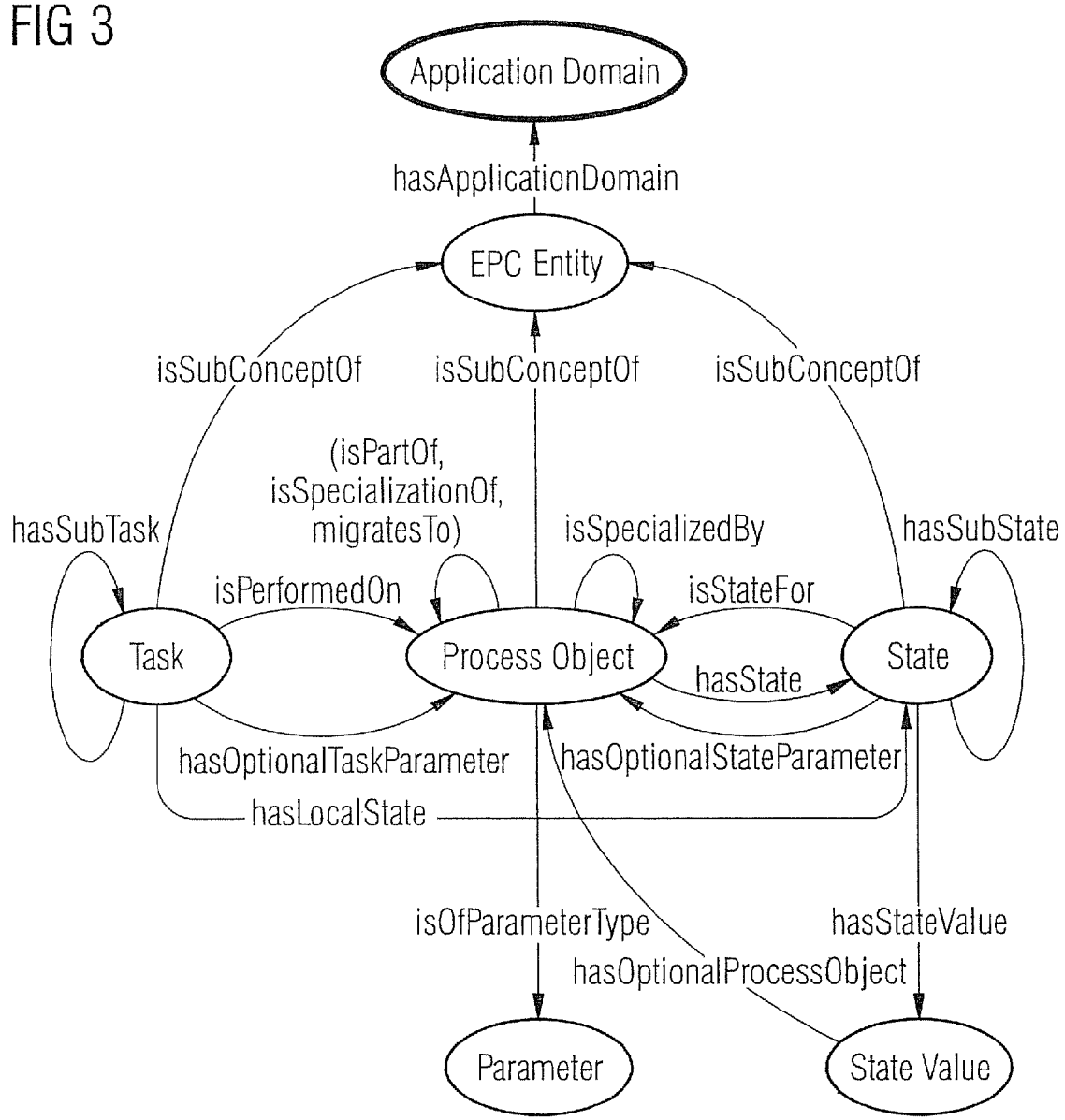
FIG. 3 shows an exemplary process ontology for capturing semantics of the process model as employed by the method an apparatus according to the present invention.

FIG. 3 depicts a possible process ontology that has a structure $O_{pro}:=(C_{Pro}, \leq_{CPro}, R_{Pro}, \sigma_{Pro})$ consisting of:
  Concepts $C_{Pro}$:
  {ApplicationDomain, EPCEntity, Task, ProcessObject, State, Parameter, StateValue}
  Concept Hierarchy $\leq C_{Pro}$:
  {(EPCEntity,ApplicationDomain), (Task,EPCEntity), (ProcessObject,EPCEntity), (State,EPCEntity)}
  Relations $R_{Pro}$: P1 {hasApplicationDomain, hasSubTask, is PerformedOn, hasOptionalTaskParameter, is Part Of, migratesTo, is SpecifiedBy, is SpecializationOf, isStateFor, hasState, hasSubState, is OfParameterType, hasOptionalStateParameter, hasLocalState, hasStateValue)}
  Signature of Relations $G_{Pro}$:
  {hasApplicationDomain→(EPCEntity, ApplicationDomain),
  hasSubTask→(Task, Task),
  isPerformedOn→(Task, ProcessObject),
  hasOptionalTaskParameter→(Task, ProcessObject),
  isPartOf→(ProcessObject, ProcessObject),
  migratesTo→(ProcessObject, ProcessObject),
  isSpecifiedBy→(ProcessObject, ProcessObject),
  isSpecializationOf→{ProcessObject, ProcessObject),
  isStateFor→(State, ProcessObject),
  hasState→(ProcessObject, State),
  hasOptionalStateParameter→(State, ProcessObject),
  hasOptionalProcessObject→(StateValue, ProcessObject),
  hasStateValue→(State,StateValue),
  isOfParameterType→(ProcessObject, Parameter)}

An application domain as shown in FIG. 3 is an overall name for a domain a process is associated with such as a process for software development. The concept EPCEntity is classified either into a Task (e.g. "Define"), a Process Object (e.g. "Software Requirements") or a State ("Identified=True") concept. A Task can be performed electronically by a service (e.g. Web Service) for achieving a desired objective. It can be specified at different levels of abstraction, refinements or specializations that are expressed by the semantic relationship hasSubTask.

A Process Object as shown in FIG. 3 represents a real or an abstract thing being of interest within a process domain. The concept for describing a Process Object has the semantic relations is Part Of, is KindOf and migratesTo. The semantic relationship is SpecilizedBy refers to a process object, if the following two conditions hold (1) a process object is kind of a more abstract process object and (2) the process object is specialized by another process object.

A State as shown in FIG. 3 refers to a Process Object indicating the state that results from performing a Task on a Process Object. State information indicates an attribute (is Attribute) for a Process Object with an assigned attribute value captured by the concept State Value.

A Parameter indicates a Process Object that may be relevant for a task execution or a state description. The concept Parameters comprises a finite set of parameter instances such as Source Direction Parameter, Target Direction Parameter, Means Parameter, Dependency parameter.

The process knowledge base is a structure $KB_{Pro}:=(O_{Pro}, I_{pro}, i_{C_{Pro}}, i_{R_{Pro}}, id_{Pro}, n_{Pro})$ consisting of $O_{Pro}$ as defined above, a set $I_{Pro}$ whose elements are called instance identifiers (or instances for short), a function $i_{CPro}:C_{Pro}\rightarrow(I_{Pro})$, called concept instantiation, a function $i_{RPro}: R_{Pro}\rightarrow(I_{Pro}^2)$ with $i_{RPro}(r_{Pro}) \subseteq i_{pro}(dom(r_{pro}))\times i_{CPro}(ran(r_{Pro}))$, for all r∈R. The function $i_{RPro}$ is called relation instantiation, a function $id_{Pro}\rightarrow$Integer where $id_{Pro}$ indicates a unique identifier for an instance, a function $n_{Pro}:I_{Pro}\rightarrow I_{Lex}$ where $n_{Pro}$ is the instance name, mapped to a root entry of the lexical knowledge base.

Figure 4:
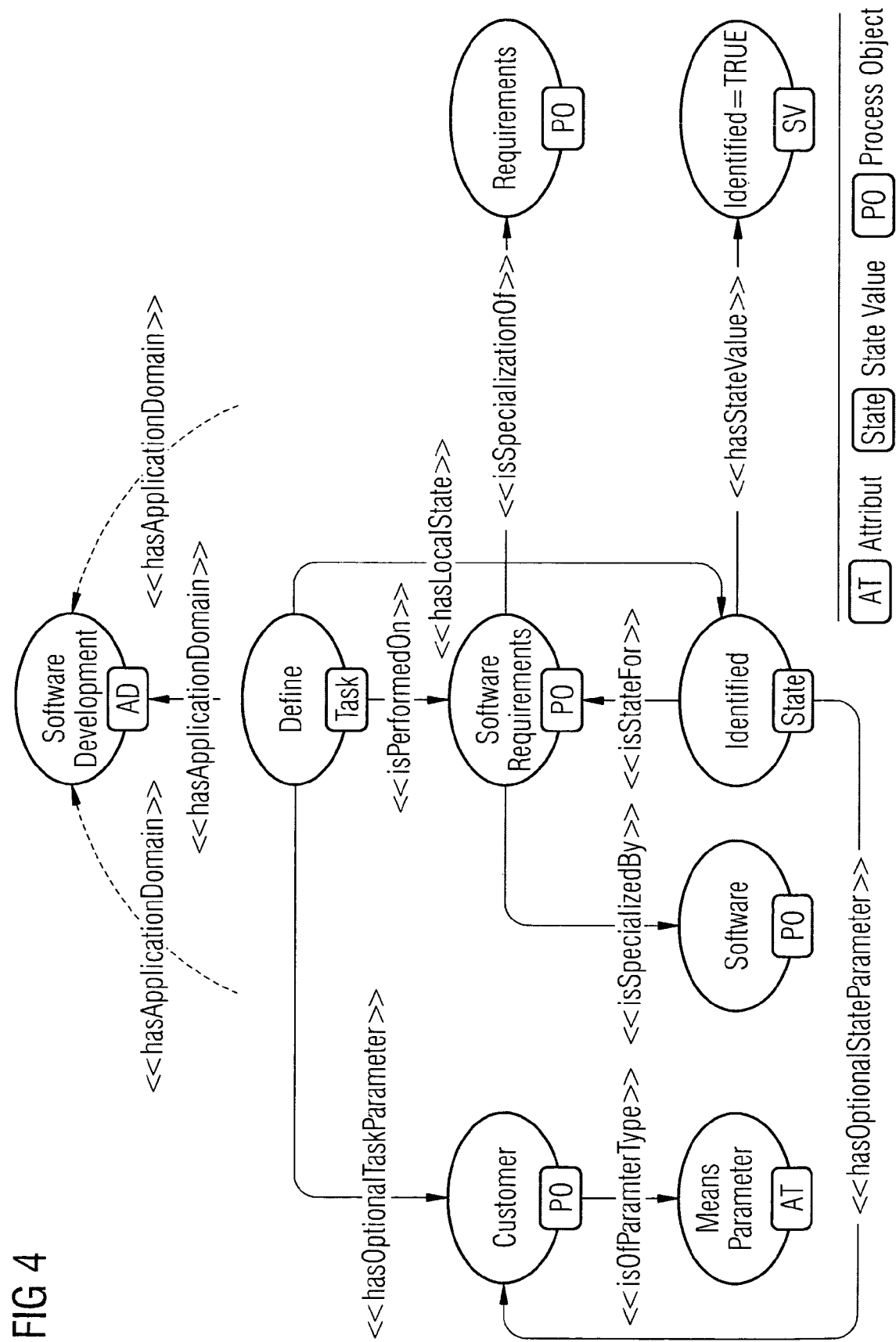
FIG. 4 shows an exemplary embodiment of the process knowledge base as employed by the method and apparatus according to the present invention.

FIG. 4 illustrates an example for knowledge base entries that capture the meanings of the text clause "Define Software Requirements With Customer" used for naming an EPC-Function and "Software Requirements Defined With Customer" used for naming an EPC-Event.

Process Knowledge Base Entries $I_{Pro}$:
{Software Development, Define, Customer, MeansParameter, Software Requirements, Software, identified, identified=True, Requirements}

Instantiated Concepts $i_{CPro}$:
(ApplicationDomain→{Software Development},
Task→{Define},
ProcessObject→{Customer},
Parameter→{MeansParameter},
ProcessObject→{Software Requirements, Software, Requirements},
State→{identified},
StateValue→{identified=True}), Instantiated Relations $i_{Pro}$:
(hasApplicationDomain→{(Define, Software Development), (Customer, Software Development), . . . }
isPerformedOn→{(Define, Software Requirements)},
hasOptionalTaskParameter→{(Define, Customer)},
isSpecifiedBy→{(Software Requirements, Software)},
isSpecializationOf→{(Software Requirements, Requirements)},
isStateFor→{(identified, Software Requirements)},
hasState→{(Software Requirements, identified)},
hasOptionalStateParameter→{(identified, Customer)},
hasStateValue→{(identified, identified=True)},
isOfParameterType→{(Customer, MeansParameter)})

Unique identifiers for instantiated Concepts $id_{pro}$:
{Software Development→(1), Define→(2), Customer→(3), Software Requirements→(4), Software→(5), Identified→(6), Requirements→(7))

Names for Instantiated Concepts $n_{Pro}$:
{Software Development→("Software Development"), Define→("Define"), Customer→("Customer"), Software→Requirements→("Software Requirements"), Software→("Software"), Identified→("Identified") Requirements→("Requirements")).

The rationale behind the lexicon is, i.e. a lexical knowledge base 4A, to provide a lightweight, controlled domain vocabulary for naming entries of the process knowledge base $KB_{Pro}$. Lexical knowledge comprises morphological and syntactic knowledge of vocabulary used for naming entries of the process knowledge base 4B. Morphological knowledge relates to word inflections such as single/plural form of a noun, active and passive of verbs. Syntactic knowledge comprises word class information and binary features such as countable/uncountable.

Publicly available resources such as WordNet database 8 as shown in FIG. 2 may provide commonsense vocabulary. In general, such open world dictionaries can comprise several hundred thousand open world entities and semantic relationships. A domain specific controlled vocabulary may comprise only several hundred entities that can be maintained easier.

Figure 5:
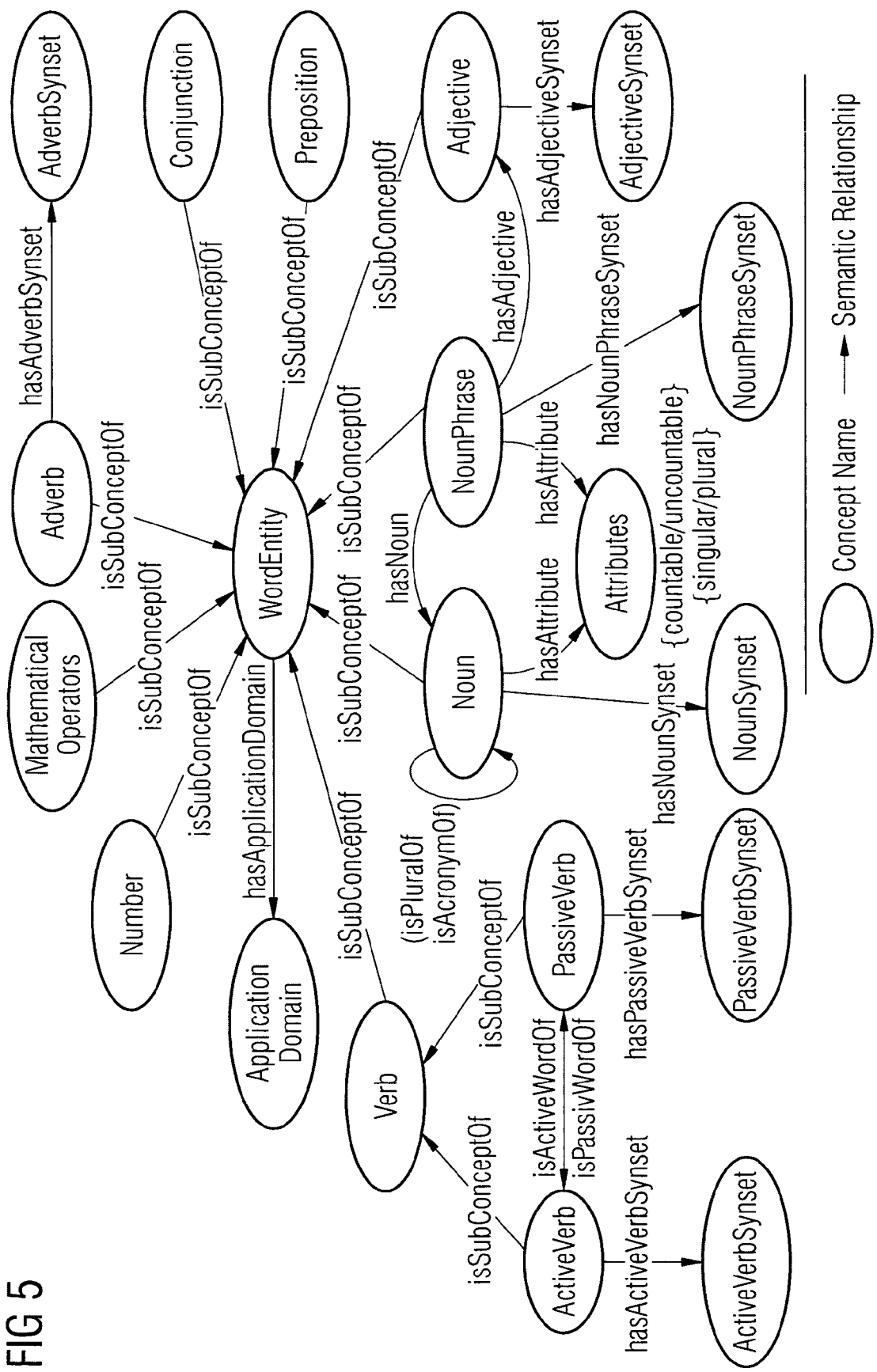
FIG. 5 shows concepts and relations of a lexical knowledge base as employed by the method and apparatus according to the present invention.

The lexicon ontology is an ontology as defined above. Further, lexical concepts are mapped to process ontology concepts and lexical entries are mapped to process knowledge base entries. Therefore, a lexicon ontology is a structure $O_{Lex}:=(O,M_C,M_1)$ where $M_c$ is a set of concept mappings such that $m_{Ci}\in M_C$: $C_{Lex}\rightarrow C_{Pro}$ called predefined mapping of concepts between lexicon and process knowledge base, $M_1$ is a set of instance mappings such that $m_{I1}\in M_1$: $I_{Lex}\rightarrow_{Pro}$ called mapping of instances between lexicon and process knowledge base FIG. 5 depicts a possible embodiment of a lexicon ontology that is a structure as follows:

Concepts $C_a$:
{WordEntity, ApplicationDomain, Number, MathematicalOperator, Adverb, Adverbsynset, Conjunction, Preposition, Adjective, AdjectiveSynset, NounPhrase, NounPhraseSynset, Attributes, Noun, NounSynset, Verb, ActiveVerb, ActiveVerbSynset, PassiveVerbSynset}

Concept Hierarchy $\leq_{c_{Lex}}$:
{(Number, WordEntity), (MathematicalOperator, WordEntity), (Adverb, WordEntity), (Conjunction, WordEntity), (Preposition, WordEntity), (Adjective, WordEntity), (NounPhrase, WordEntity), (Noun, WordEntity), (Verb, WordEntity), (ActiveVerb, Verb), (PassiveVerb, Verb)}

Relations $R_{Lex}$
[hasApplicationDomain, hasAdverbSynset, hasAdjectiveSynset, hasAdjective,
hasNounPhraseSynset, hasNoun, hasAttribute, hasNounSynset, is PluralOfNoun,
is AcronymOfNoun, is PluralOfNounPhrase, isAcronymOfNounPhrase, is ActiveVerbOf,
is PassiveWordOf, hasPassiveVerbSynset, hasActiveVerbSynset Signature of Relations $\sigma_{Lex}$:
{hasApplicationDomain→(WordEntity, ApplicationDomain),
hasAdverbSynset→(Adverb, AdverbSynset),
hasAdjectiveSynset→(Adjective, AdjectiveSynset),
hasAdjective→(NounPhrase, Adjective),
hasNounPhraseSynset→(NounPhrase, NounPhraseSynset),
hasNoun→(NounPhrase, Noun),
hasAttribute→{(NounPhrase, Attribute), (Noun, Attribute)},
hasNounSynset→(Noun, NounSynset),
isPluralOfNoun→(Noun, Noun),
isPluralOfNounPhrase→(NounPhrase, NounPhrase),
isAcronymOfNoun→(Noun, Noun),
isAcronymOfNounPhrase→(NounPhrase, NounPhrase),
isActiveVerbOf→(ActiveVerb, PassiveVerb),
isPassiveVerbOf→(PassiveVerb, ActiveVerb),
hasPassiveVerbSynset→(PassiveVerb, PassiveVerbSynset),
hasActiveVerbSynset→(ActiveVerb, ActiveVerbSynset)

The top-level concept Application Domain shown in FIG. 5 is a set of application domain names the lexical entry refers to. A Word Entity classifies a lexical entry either into a Number, Mathematical Operators, Verb, Adverb, Adjective, Noun, NounPhrase, Preposition, Conjunction and has set of instances of the concept Application Domain assigned. The concepts Mathematical Operators, Conjunction and Preposition represent concepts with a finite set of initial instances.

The concept Mathematical Operators has the following set of finite instances: {for each, equal, greater than, smaller than, equal), a Conjunction comprises the instance {and}, a Preposition concept has the instances {from, of, upon, with, for}.

A Verb is either an Active Verb or a Passive Verb. The concepts Active Verb and Passive Verb are interrelated by a bidirectional relationship described by is ActiveWordOf and is PassiveWordOf. A Noun is related by following relationship set: is PluralOf, is AcronymOf, hasNounPhraseSynset. Additionally, a Noun has a set of Attributes (countable/uncountable, singular/plural). A NounPhrase consists optionally of an adjective followed by instances of nouns.

Each of the concepts Adverb, ActiveVerb, PassiveVerb, NounPhrase, Adjective have a synset assigned that captures instances of synonyms.

Figure 6:
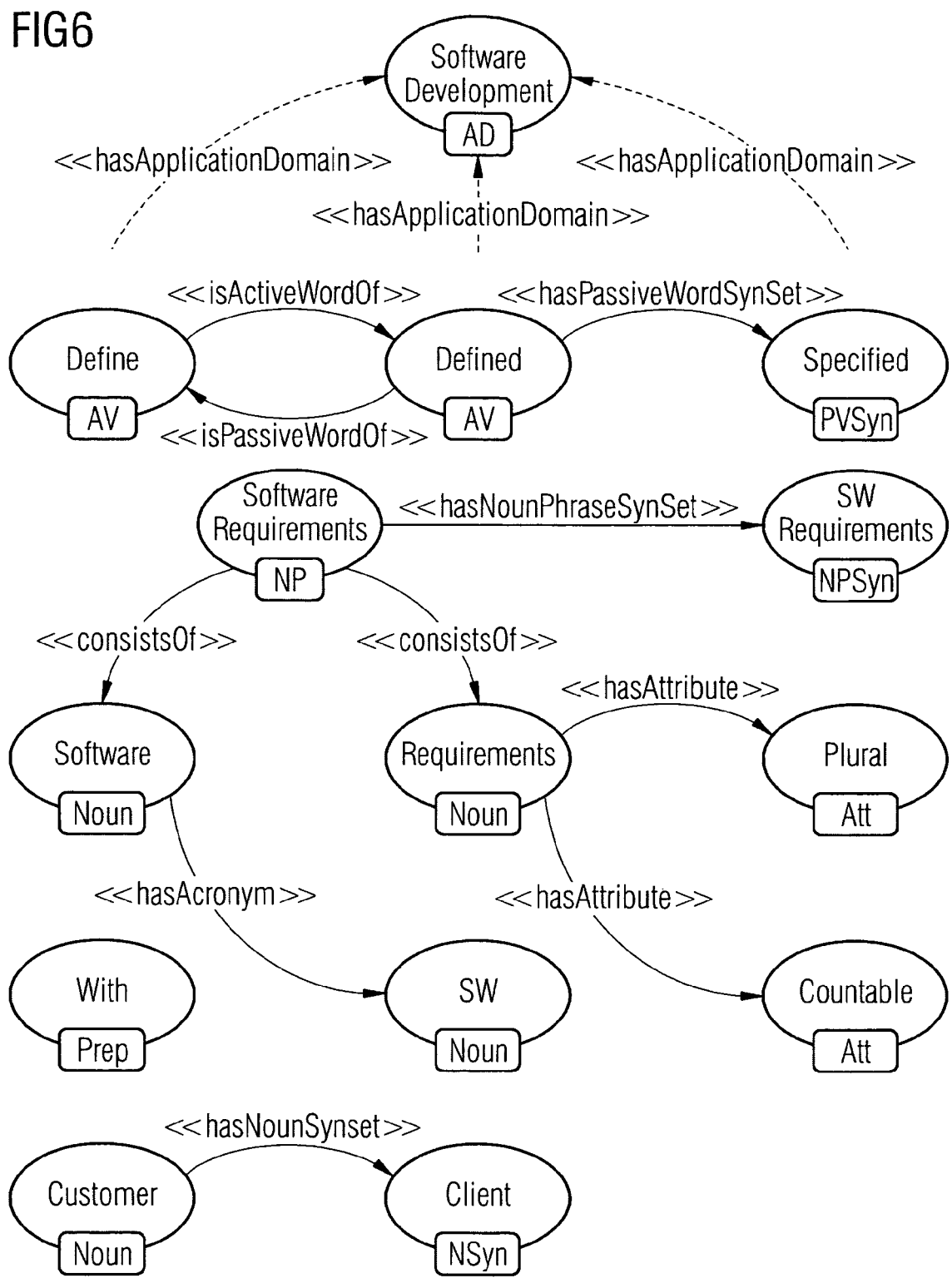
FIG. 6 shows an example for entries of a lexical knowledge base shown in FIG. 5.

FIG. 6 illustrates an example for lexical entries that capture the vocabulary of the text clause "Define Software Requirements With Customer" used for naming an EPC-Function and "Software Requirements Defined With Customer" used for naming an EPC-Event. Please note, that these entries denote the vocabulary used for naming instances captured by the process knowledge base.

Lexical Entries $I_{Lex}$:
{"Software Development", "Define", "Defined", "Software Requirements", "SW Requirements", "Software", "Requirements", "With", "SW", "Customer", "Client", "Specified", "Plural", "Countable")}

Instantiated Concepts $i_{C_{Lex}}$:
(ApplicationDomain→{Software Development},
ActiveVerb→{Define}, PassiveVerb→{Defined},
NounPhrase→{Software Requirements},
Noun→{Software, SW, Customer, Requirements},
Preposition→{With}, NounSynset→{Client},
NounPhraseSynset→{SW Requirements},
PassiveVerbSynset→{Specified},
Attribute→{Singular, Countable)}

Instantiated Relations $i_{R_{Lex}}$:
(hasApplicationDomain→{(Define, Software Development), (Defined, Software DevelopmenD, . . . },
isActiveVerbOf→{(Define, Defined),
isPassiveVerbOf→{(Defined, Define)},
hasPassiveVerbSynset→{(Defined, Specified)},
hasNounPhraseSynset→{(Software Requirements, SW Requirements)},
consistsOf→{(Software Requirements, Software), (Software Requirements, Requirements)),
hasAttribute→{(Requirements, Plural), (Requirements, Countable)),
hasAcronym→{(Software, SW)},
hasNounSynset→{(Customer, Client)}).

Mapping of Lexical Entries to Process Knowledge Base Entries $M_f$:
{"Software Development"→(1), "Define"→(2), "Customer"→(3), "Software Requirements"→(4), "Software"→(5), "Identified"→(6), "Requirements"→(7)}

The lexical knowledge (morphological and syntactic knowledge) is decoupled from process knowledge. The textual counterpart for naming entries of the process knowledge base 4B is realized by the lexical knowledge base 4A.

The mapping between lexical entries and process knowledge base entries relies on some predefined rules expressed by naming conventions. Such conventions define a grammar or a pattern that specifies how EPC-Functions and Events should be named. A naming convention bridges the gap between the syntax of used terms and its semantics by mapping concepts and instances of the lexicon to concepts and instances of the process knowledge base.

A pattern is an ordered combination of pairs (n-tuple of pairs) whereas each pair consists of a word type and its semantic category (concept of the process knowledge base) it is mapped to. A pattern like ([Active Verb=Task] [Noun=ProcessObject]) can be matched to the text clause "Define Requirements" used to name an EPC-Function to extract task and process object information.

By using naming conventions expressed by patterns, the method according to the present invention achieves fast and efficient text processing by directly mapping terms to its meaning. Based on an empirical study of about 5,000 EPC-Functions and Events in engineering domains that were named by the English language, the following common naming conventions for EPC-Functions and Events have been detected. Due to the introduced generic approach for semantic annotation, additional conventions can easily be considered, respectively integrated in the whole architecture, independent of the used language.

Basically, an EPC-Function should be named by a text phrase following the pattern ([Active Verb=Task] [Noun=Process Object]). The term $t_1$ ("Define") has the semantics of a task, $t_2$ ("Project Plan") indicates a process object. Hence, a task is always mapped to an active verb.

The term for the description of a process object (PO) is expressed by a single noun or a noun phrase. A noun phrase denotes a composition of nouns that may have optionally an adjective. As a general rule refinements of process objects should be named with additional nouns or adjectives and stop words are omitted as far as possible. For example the noun "Requirements" can indicate an abstract process object. Terms meaning refinements of this process object should be named "Software Requirements" or "Hardware Requirements" and not "The Requirements For Software" or "Requirements Of Software", for example. This guideline can be expressed by the pattern ([Active Verb=Task]

[NounPhrase=Process Object]). This implies automatically that an active verb associates to a task, a noun phrase to a process object.

A naming convention for the definition of parameters plays a role since they may adopt a different meaning. The different types of parameters are already discussed by the process knowledge base concepts.

"Derive Quality Goal from Specification Document" indicates "specification Document" as a Source Direction Parameter. The meaning of a Source Direction Parameter is derived from the preposition "from" that refers to a succeeding process object.

"Rework Specification for Project Plan" specifies "Project Plan" as a Target Direction Parameter, since the process object "Project Plan" is the target of task execution. It is derived from the preposition "for".

"Rework Specification with Software Goals" indicates "Software Goals" as a Means Parameter. The process object "Software Goals" has the meaning of a necessary input for the task "Rework". Such a parameter is determined by the preposition "With".

"Decide Quality Measure Upon Review Status" specifies "Review Status" as a Dependency Parameter. This means that the task "Decide" depends on the process object "Review Status". This parameter type is determined by the preposition "Upon".

Using parameters in text phrases can follow the pattern ([Active Verb=Task][Noun=Process Object] [Preposition=Parameter] [Noun=Process Object]).

The semantic elements for an EPC-Event can capture state information of a process object. According to an EPC-Function, an Event may have also have one or more parameters the state refers to. Hence, the guidelines for naming process objects and parameters matches with the conventions proposed for EPC Functions.

State information can be expressed by a word being either a passive word or an adjective word followed by a process object. The text clause "Project Plan Defined" comprises the term $t_1$ ("Project Plan") and $t_2$ ("Defined") that indicates state information for the process object "Project Plan". This guideline can be expressed by the patterns ([Noun Phrase=Process Object] [Passive Verb=State]) or ([Noun Phrase=Process Object] [Adverb=State]).

Another rule denotes the naming of trivial events. A trivial event refers to a local state that results directly from an EPC Function and both Function and Event refers to the same process object. The EPC-Event "Project Plan Defined" indicates a trivial Event for the Function named "Define Project Plan", for example. The naming of a trivial event follows the rule that the state information indicates the passive form of the active verb used by a text phrase that describes an EPC-Function.

In many cases, textual description for an EPC-Function or Event refers to more than one task or state and/or to more than one process object and/or more than one parameter. Such combinations can be expressed by an "And" conjunction used between active and passive words and nouns or noun phrases.

As already indicated above, a lexicon is defined as a structure $O_{Lex}:=(O, M_C, M_1)$. The set $M_C$ consists of mappings between lexicon concepts and process knowledge base concepts, the set $M_1$ has mappings between lexicon entries and process knowledge base entries. Based on above discussed naming conventions, the following predefined mappings are defined:

$M_C:=\{(C_{Lex}(AVerb) \rightarrow C_{Pro}(Task)),(C_{Lex}(PVerb, Adverb) \rightarrow C_{Pro}(State)),(C_{Lex}(Noun) \rightarrow C_{Pro}(ProcessObject)),(C_{Lex}(NounPhrase) \rightarrow C_{Pro}(ProcessObject)),(C_{Lex}(Adjective,Noun) \rightarrow C_{Pro}(ProcessObject)),(C_{Lex}(Preposition) \rightarrow C_{Pro}(Parameter))\}$. $M_c:=\{(I_{Lex}("For","To") \rightarrow I_{Pro}(TargetDirectionParameter)),(I_{Lex}(!From","Of") \rightarrow I_{Pro}(SourceDorectopmÜara,eter)),(I_{Lex}("With") \rightarrow I_{Pro}(MeansParameter)),I_{Lex}("Upon") \rightarrow I_{Pro}(DepndencyParameter))\}$ The Semantic pattern descriptions 6 as shown in FIG. 2 enable to formalize predefined naming conventions by specifying semantic pattern templates and template structures for EPC-Functions and Events. Term structures extracted from names used to describe EPC-Functions and Events are matched against these predefined pattern descriptions in order to determine the meaning of each term. Finally, the meaning of each term is bound to semantic pattern variables in order to establish the semantic linkage between EPC-Functions and Events and process knowledge base entries.

Formally, a semantic pattern description 6 is given as a tuple SPD :=(S, TR) consisting of S that defines the semantic pattern template, TR is a set of pairs $(\{t_i, r_j\}|(T=\{t_1, \ldots t_n\}, R=\{r_1, \ldots r_n\})$ where $t_i \in T$ and $r_j \in R$), T is a set of template structures and R is a set of analysis rules.

A semantic pattern template is a tuple S:=(C,V) consisting of

C is the domain name, such as Software or Hardware.

V is a set of ordered n-tuples $\{v_1, v_i, \ldots, v_n\}$ where i≤n. A variable $v_i \in V$ is a pair $(c_{Pro}, i_{Pro})$ where $c_i \in c_{Pro}$ is a variable name that points a $KB_{Pro}$ concept and $i_{Pro} \in I_{Pro}$ is a value for $c_i$ that points to an instance of the concept $c_i$ refers to.

The notation $S_E$ is used to indicate a semantic pattern template for an EPC-Event, $S_F$ for a semantic pattern template assigned to an EPC Function. The following notation for concepts of the process knowledge base can be used:{ (TA=Task), (PO=Process Object), (PA=Parameter), (ST=State)}.

A semantic pattern template for an EPC-Function comprises a Task (TA) that is performed on a Process Object (PO) which may have optionally a Parameter (PA).

This semantic pattern template is defined as $S_F$ (Domain=?):=$\{[V_1(C_{Pro}(TA),i_{Pro}(?))],[V_2(C_{Pro}(PO),i_{Pro}(?)];[V_3(C_{Pro}(PO),i_{Pro}(?))],[V_4(C_{Pro}(PO),i_{Pro}(?))]\}$.

It consists of an ordered set of four tuples with the variables V=$\{v_1, v_2, v_3, v_4\}$. The question mark indicates an unbounded template. Such a semantic pattern template is instantiated by binding values to each variable and to the domain. Thus, a bound semantic pattern template realizes the semantic linkage between an EPC-Function and Event and its meaning.

Figure 7:
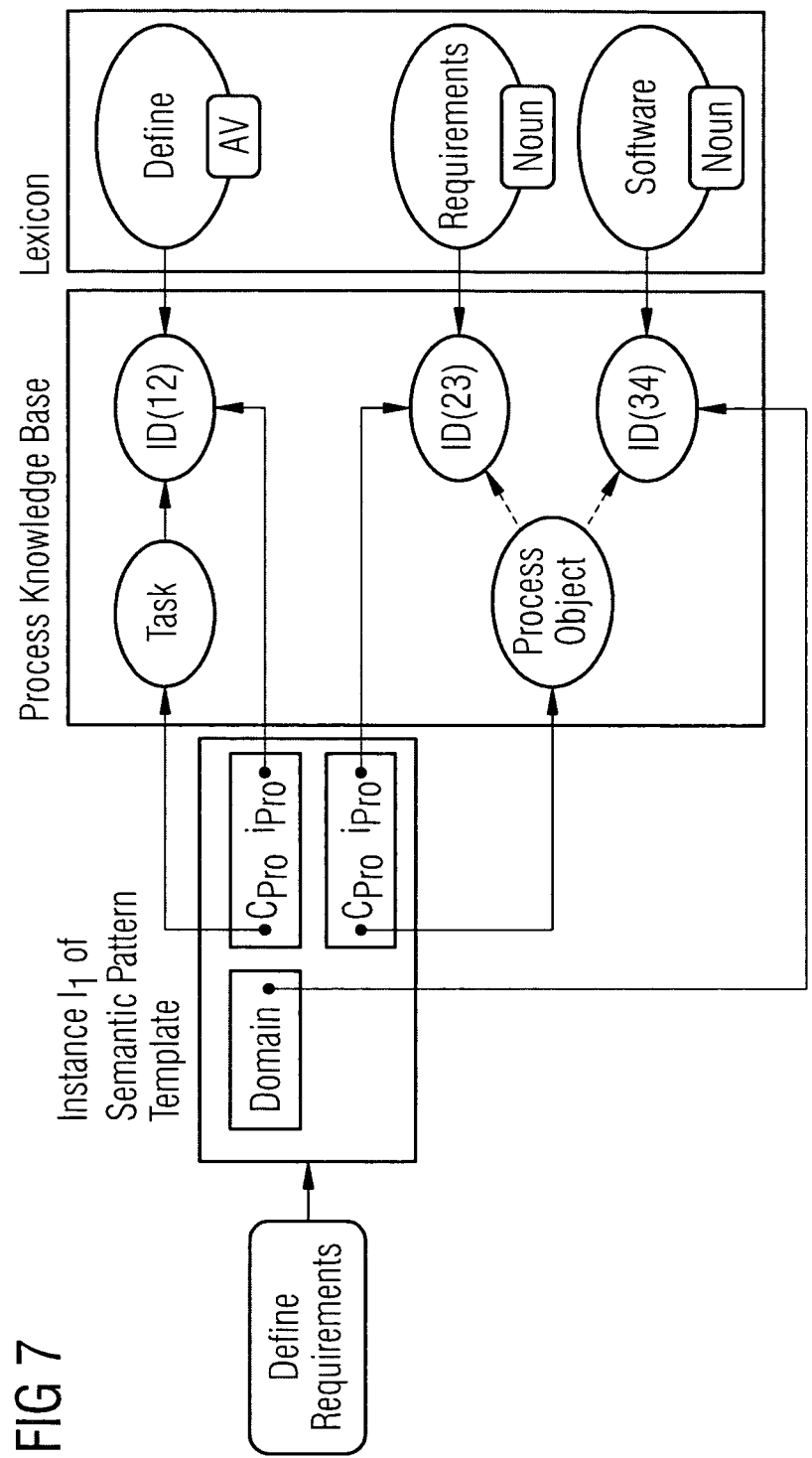
FIG. 7 shows an example for a semantically annotated EPC function.

FIG. 7 illustrates an example how the EPC-Function "Define Requirements" is semantically annotated by a bounded semantic pattern template which has the two variables $v_1$ and $v_2$. The variable $V_1(C_{Pro})$ points to the process ontology concept Task, $V_1(i_{Pro})$ has is bound to the process knowledge base entry with ID(12) that is lexically represented by the lexicon entry "Define"; the variable $V_2(C_{Pro})$ points to the process ontology concept Process Object, $V_2(i_{Pro})$ is bound to the process knowledge base entry with the ID(23) that is lexically represented by the lexicon entry "Requirements".

The semantic pattern template predefined for an EPC-Event is based on the process knowledge base concepts Process Object and State that optionally refers to a Parameter. This semantic pattern template is defined as following template having also four variables:

$S_E$(Domain=?):=$\{[V_1(C_{Pro}(PO),i_{Pro}(?))],[V_2(C_{Pro}(ST),i_{Pro}(?)];V_3(C_{Pro}(PA),i_{Pro}(?))], [V_4(C_{Pro}(PO),i_{Pro}(?))]\}$ Each EPC-Function and Event is annotated with instances of these predefined semantic pattern templates. In many cases, used names for EPC-Function and Event descriptions address more than one Task, more than one Process Object or more than one Parameter or a combination of them. In such cases, an EPC-Function or Event is annotated by several instantiated semantic pattern templates.

For Example "Define Requirements and Goals" can be a name for an EPC-Function. The Task named "Define" addresses the two Process Objects "Requirements" and "Goals". Hence, the EPC-Function will be annotated with two instances of semantic pattern templates, the first template captures the meaning of "Define Requirements", the second the meaning of "Define Goals".

To cope with this in a possible embodiment, template structures in combination with analysis rules are introduced. Template structures are predefined templates assigned to semantic pattern templates. Their purpose is to map different occurring term structures extracted from used names to semantic pattern templates and to instantiate them by applying analysis rules. This means, that template structures define valid task, Process Object and Parameter combinations.

The template structure is a tuple $T=(I, V)$ consisting of
I an unique identifier,
V as previously defined The notation $T_E$ is used to indicate a template structure for an EPC Event, $T_F$ for a template structure that is assigned to an EPC Function. Each predefined semantic pattern template can have exactly two template structures assigned.

The semantic loattern template $S_F$ as previously defined has the following template structures assigned:
$T_{F_1}\{[V_1(C_{Pro}(TA),i_{Pro}(?))],[V_2(C_{Pro}(PO),i_{Pro}(?)]$
$T_{F_2}:=55\ [V_1(C_{Pro}(TA),i_{Pro}(?))],[V_2(C_{Pro}(PO),i_{Pro}(?)];[V_3(C_{Pro}(PA),i_{Pro}(?))],[V_4(C_{Pro}(PO),i_{Pro}(?))]\}$ $S_E$ as previously defined for an EPC-Event comprises the following template structures:
$T_{E_1}:=\{V_1(C_{Pro}(PO),i_{Pro}(?))],[V_2(C_{Pro}(ST),i_{Pro}(?)]$
$T_{E_2}:=\{[V_1(C_{Pro}(PO),i_{Pro}(?))],[V_2(C_{Pro}(ST),i_{Pro};[V_3(C_{Pro}(PA),i_{Pro}(?))],[V_4(C_{Pro}(PO),i_{Pro}(?))]\}$ The variables and its index of each template structure exactly match with the associated semantic pattern template. Analysis rules generate on the basis of a template structure one or several instances of the predefined semantic pattern templates $S_E$ and $S_F$ by applying rules that specify how the template structure is logically resolved.

An analysis rule R is specified by a precondition and a body separated by a "→". The precondition consists of the operator MATCH. The operator MATCH compares predefined template structures with term structures extracted from names. A term structure denotes a normalized representation of text phrases that refers to $KB_{Lex}$ concepts. The body comprises the operator GENERATE that generates one or several instances of semantic pattern templates and assigns the instantiated semantic pattern template(s) to an EPC-Function or Event. Let U be a term structure that is notated as a pattern such as [Active Verb=Task] [NounPhrase=Process Object].

The following notation for an analysis rule R is given: If(MATCH(U,T($v_1, \ldots v_n$)))→GENERATE($\{S(v_1, \ldots v_n)\}$). This notation means that if a term structure matches with a predefined template structure with an ordered n-tuple of variables ($v_r, \ldots v_n$) then generate a set of instantiated semantic pattern templates.

The following rule set defines some possible analysis rules for semantic pattern templates used for an annotation of EPC-Functions. This rule set is not an exhaustive enumeration of all possible combinations since the declarative nature of rules enables to define an arbitrary rule set.

One Task. One State, One Process Object:
U:=[Active Verb=Task] [Noun=Process Object] is a term structure for a name such as "Define Requirements".
$T:=\{[V_1(C_{Pro}(TA),i_{Pro}(?))],[V_2(C_{Pro}(PO),i_{Pro}(?)]$ is a template structure that matches with this term structure. The $R_1:=$If (MATCH(U, T($v_1, v_2$))→GENERATE ($\{S_1(v_1, v_2)\}$) generates one instance of a semantic pattern template having the bounded variables $v_1$ and $v_2$.

More than One Process Object:
This rule means that if a template structure refers to more than one Process Object then the number of Process Objects determines the number of semantic pattern templates being instantiated, each having the same Task.

U:=[Active Verb=Task] [Noun=Process Object] [Conjunction] [Noun=Process Object] is a term structure for a name such as "Define Requirements and Goals". $T:=\{[V_1(C_{Pro}(TA),i_{Pro}(?))],[V_2(C_{Pro}(PO),i_{Pro}(?)];[V_3(C_{Pro}(PO),i_{Pro}(?)]\{$ is a template structure that matches with this term structure. The $R_2:=$If(MATCH (U, T($v_1, v_2, v_3$))→GENERATE$\{(S_1(v_1,v_2), S_2(v_1, v_3))$ generates two instances of a semantic pattern template having the bounded variables $v_1, v_2$ and $v_3$.

More than One Task:
This rules means that if a template structure refers to more than one Task then the number of Tasks determines the number of semantic pattern templates being instantiated, each having the same Process Object.

U:=[Active Verb=Task][Conjunction][Active Verb=Task] [Noun=Process Object] is a term structure for a name such as "Define and Analyze Requirements". $T:=\{[V_1(C_{Pro}(TA),i_{Pro}(?))],[V_2(C_{Pro}(TA),i_{Pro}(?)];[V_3(C_{Pro}(PO),i_{Pro}(?)]\}$ is a template structure that matches with this term structure. The $R_2:=$If (MATCH(U, T($v_1, v_2, v_3$))→GENERATE ($\{S_1(v_1, v_3), S_2 (v_2/v_3)\}$) generates two instances of a semantic pattern template having the bounded variables $v_1, v_2$ and $v_3$.

More than One Parameter
This rule means that if a template structure refers to more than one Parameter then the number of Parameters determines the number of semantic pattern templates being instantiated, each having the same Task and Process Object.

U:=[Active Verb=Task] [Noun=Process Object] [Preposition] [Noun=Process Object] [Conjunction][Preposition] [Noun=Process Object] is a term structure for a name such as "Define Requirements for Hardware and Software". $T:=\{[V_1(C_{Pro}(TA),i_{Pro}(?))],[V_2(C_{Pro}(PO),i_{Pro}(?)];[V_3(C_{Pro}(PA),i_{Pro}(?)][V_4(C_{Pro}(PO),i_{Pro}(?)][V_5(C_{Pro}(PA),i_{Pro}(?)][V_6(C_{Pro}(PO),i_{Pro}(?)]$ is a template structure that matches with this term structure. The $R_2:=$If (MATCH(U, $v_1, v_2, v_3, v_4, v_5, v_6$))→GENERATE ($S_1(v_1, v_2, v_3, v_4, S_2 (v_1, v_2, v_5, v_6,)\}$) generates two instances of a semantic pattern template having the bounded variables $v_1, v_2, v_3, v_4, v_5,$ and $v_6$.

The above mentioned rules can be combined to resolve the semantics of larger template structures. For example, a template structure may have more than one task or state combined with more than one process object.

Based on the introduced concepts, a semantic annotation of EPC-Functions and Events are made with automated support since a human driven proceeding denotes a tedious, cumbersome task that may result easily in a knowledge acquisition bottleneck.

FIG. 2 depicts components of an apparatus 1 for automated semantic annotation according to the present invention. Names of EPC-Functions and Events expressed by text clauses are input for the Term Normaliser 3 that extracts the term structure of that clause and a normalized representation of terms. Based on the term structure, the Semantic Pattern Analyzer 2 finds a corresponding pattern template. Afterwards, semantic pattern templates are instantiated by evaluating the analysis rules associated to a corresponding pattern template. Finally, the EPC-Function or Event is annotated with binded semantic pattern templates.

Extracting the meaning of text phrases that describe EPC-Events and Functions requires a normalized preparation. The term normaliser 3 shown in FIG. 2 performs a linguistic normalization that aims at reducing each form of a term to a standardized form that is captured by an EPC label. A label L is a tuple (W, E, U, φ) consisting of $W=\{w_1, \ldots, w_n\}$ is a set of words having a reference to lexicon entries ($I_{Lex}$), $E=\{e_1, \ldots e_n\}$ is an ordered n-tuple of terms with the index $e_1$ having a reference to lexicon entries ($I_{Lex}$), U is a term structure of E that is an ordered n-tuple $(u_1, \ldots, u_n) \epsilon C_{Lex}$ with an index $u_i$ a term $e_i$ refers to, φ is a function E→W that maps a term $e_i \epsilon E$ to an ordered n-tuple $(w_1, \ldots, w_n) \epsilon I_{Lex}$ of Words A term structure U is described according to the following notation:

$u_i(c_{Lex}(SourceName_{\to cPro(TargetName)}))$: SourceName indicates a concept name for a lexicon ($c_{Lex}$), TargetName is the name of a concept for the process knowledge base ($c_{Pro}$), a SourceName is mapped to. The mapping $c_{Lex}$ (AVerb) $c_{Pro}$(Task) is notated as $u_1(C_{Lex}(AVerb_{\to CPro(Task)}))$.

$u_i$ ($I_{Lex}$ (SourceName$_{\to IPro(Target\ Name)}$)): SourceName indicates an Instance name for a lexicon ($i_{Lex}$), TargetName is the name of an Instance for the process knowledge base ($i_{Pro}$), a Source is mapped to. The mapping $i_{Lex}$("For") $i_{Pro}$ (TargetDirectionParameter) is notated as $u_i(i_{Lex}("For"_{\to iPro\ (TargetDirectionParameter)}))$.

Figure 8:
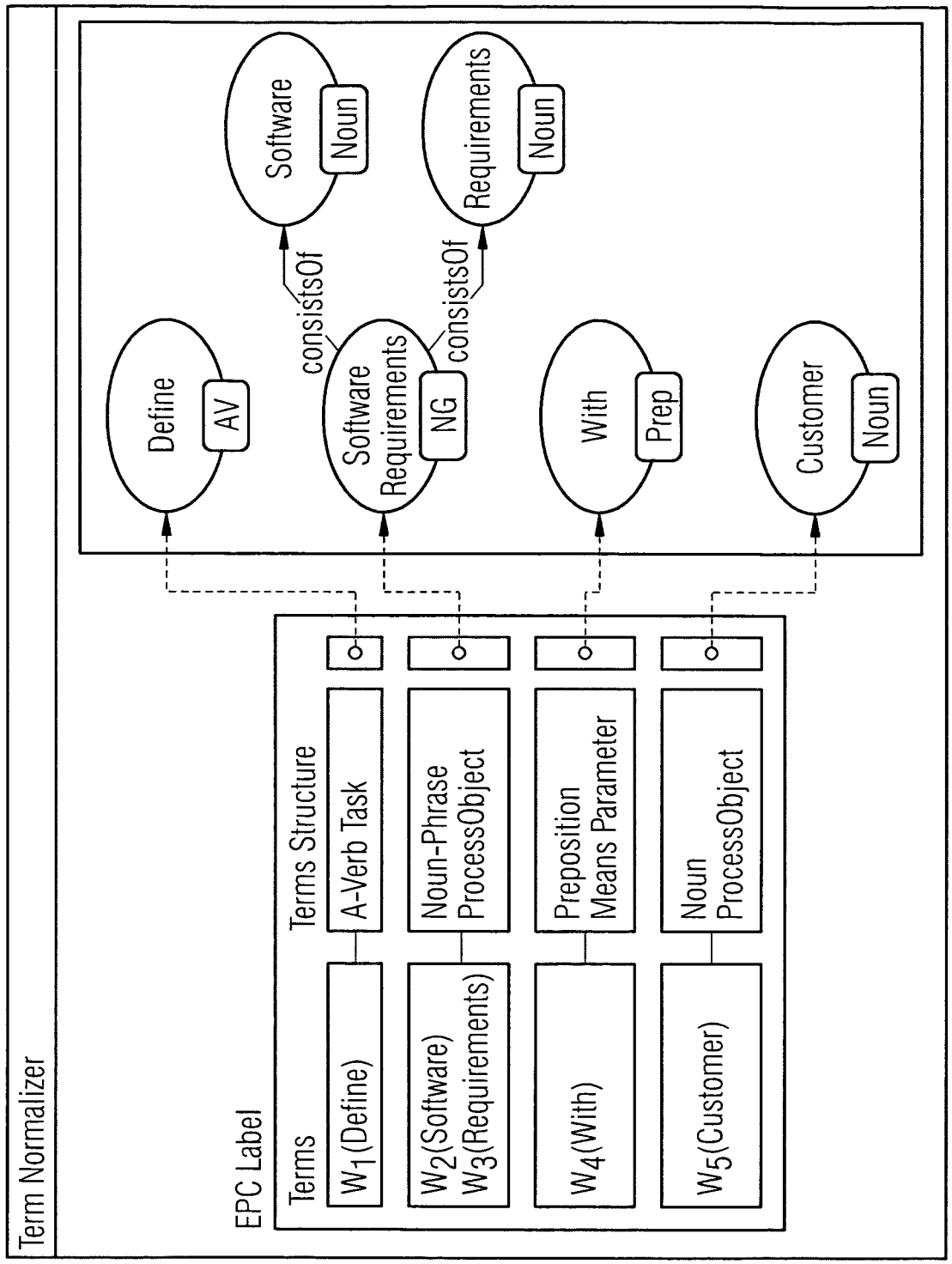
FIG. 8 shows an example for a label extracted by a term normaliser of an apparatus according to the present invention.

The index i refers to the term with the index i within the set E. Based on this notation, a term structure reflects a used guideline by a text phrase describing an EPC-Function or Event. The fundamental conventions for naming an EPC-Function $U_{F_1}$ and for an EPC-Event $U_{E_1}$ can be described by following term structures:

$-U_{F_1} := \{[u_1(C_{Lex}(AVerb_{\to C^{Pro}(Task)}))],[u_2(c_{Lex}, (Noun_{\to C^{Pro}(ProcessObject)}))]\}$ $-U_{E_1} := \{[u_1(C_{Lex}(Noun_{\to C^{Pro}ProcessObject)}))],[u_2(c_{Lex} (PVerb_{\to C^{Pro}(State)}))]\}$ FIG. 8 depicts an example for a label L extracted from the text phrase "Define Software Requirements with Customer". It comprises the terms "Define", "Software Requirements", "With" and "Customer". The term "Define" is mapped to the word $w_1$("Define"), "Software Requirements" is mapped to the words $w_2$("Software") and $w_3$("Requirements"), "With" is mapped to the word $w_4$("With") and "Customer" is mapped to the word $w_5$("Customer"). Based on this terms the term structure $U_{F_1} := \{[u_1(c_{Lex}(AVerb_{\to C^{Pro}(TA)}))],[u_2(c_{Lex}(Noun\ Phrase_{\to C^{Pro}(PO)}))],[u_3(c_{Lex} (Preposition_{\to C^{Pro}(MeansParameter)}))],[u_4(c_{Lex} (Noun_{\to C^{Pro}(PO)}))]\}$ results.

Figure 9:
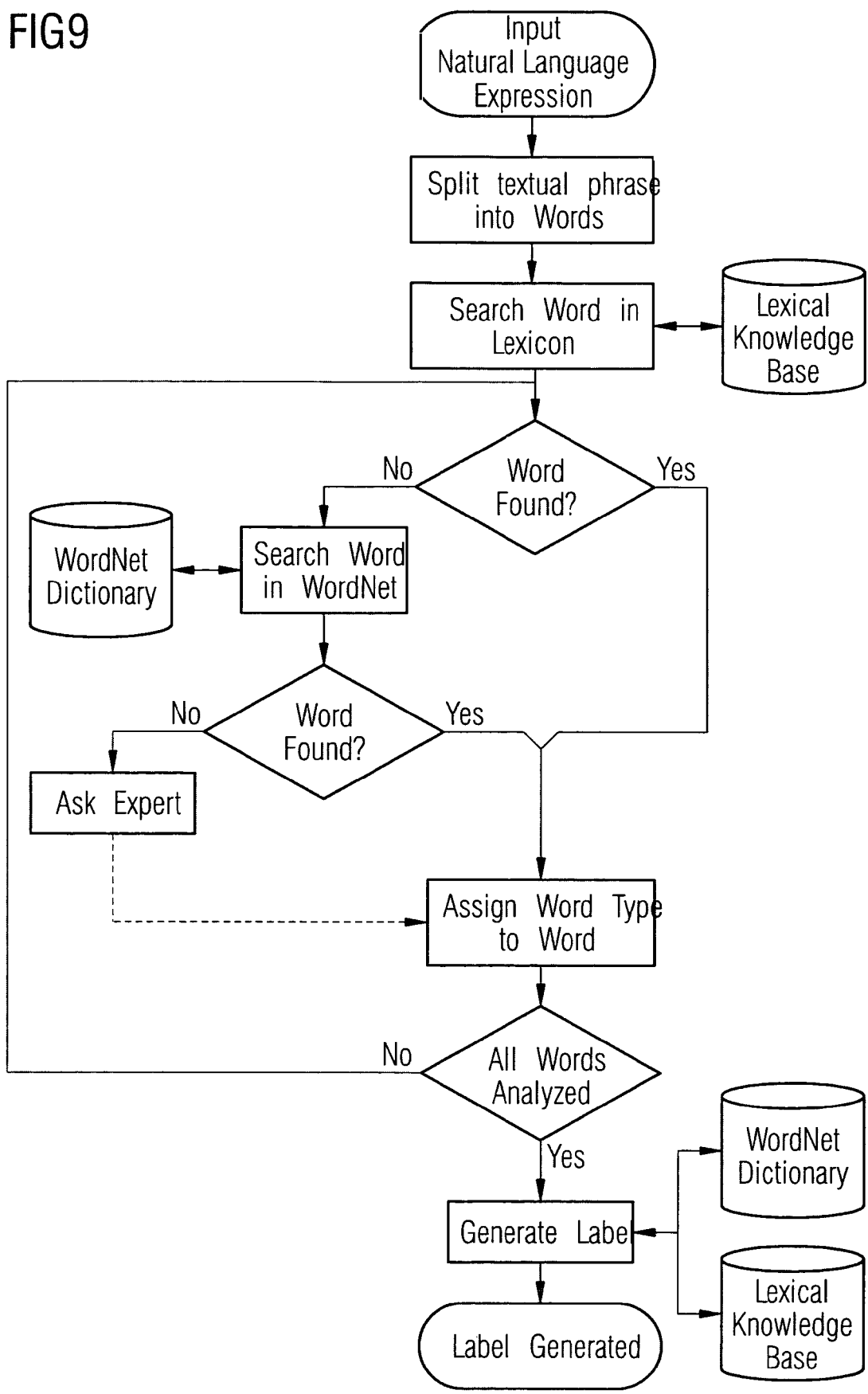
FIG. 9 shows a flow chart for generation of labels as performed by a method according to the present invention.

FIG. 9 depicts a proceeding that extracts a label L from a text phrase. The extraction of labels L splits a text phrase into words (tokenization) and determines the word type ($W_{type}$) for each split word. Further, the Term Normaliser 3 also addresses the resolving of naming conflicts that are reduced to synonyms and abbreviations in this work. Homonyms can be neglected when a non-ambiguous meaning of used vocabulary in a specific domain is provided. For example, the domain represents engineering processes, application domains are specific instances for that domain, such as Software Development or Hardware Development. Each vocabulary—captured by the lexical knowledge base—used by an application domain has a unique meaning within a specific domain.

The word type of a word is determined by the concept name a lexical entry is instance of. Hence, the lexicon entries are queried for that word. A query considers semantic relationships (e.g. is AbbreviationTo) associated to a lexical entry (e.g. SW is an abbreviation of Software). If a search for is successful, the word type derives from the concept name the matched word is an instance of. In case of naming conflicts, the Term Normaliser 3 follows the rule to deliver the base word. For instance, the word "SW" has been identified as an abbreviation of "Software", consequently, the term normaliser delivers the term "Software" as a noun.

If a query for a word in the lexicon delivers an empty result, an automatically driven word classification is not feasible. A publicly available dictionary such as WordNet 8 can be employed for word classification and synonym detection. The schema of WordNet comprises the three main classes synset, word Sense and word. A synset groups words with a synonymous meaning, such as {car, auto, machine}. Due to different senses of words, a synset contains one or more word senses and each word sense belongs to exactly one synset. A synset either contains the word classes nouns, verbs, adjectives or adverbs. There are seventeen relations between synsets (e.g. hyponymy, entailment, meronymy, etc.) and five between word senses (e.g. antonym, see also).

The term normaliser 3 retrieves semantic information by consulting WordNet 8. A WordNet query delivers either a set of word classes and synonyms (associated to the queried word) or an empty set. In case of delivering an empty set the Term Normaliser 3 requires an interaction with the analyst in order to get a human classification entry.

Input for the generation of a label is an ordered n-tuple of words each having a word type assigned; output is an ordered n-tuple of terms that refer to corresponding lexical entries. The construction of terms must observe the following rules:

Rule 1: If a word optionally starts with an adjective and its succeeding words are assigned to the word type Noun, then a term consists of these ordered set of words. This rule defines how noun phrases or noun phrases are mapped to a term.

For example an ordered word set with following pairs can be given: {("Initial", Adjective), ("Software", Noun), ("Requirements", Noun)]. Based on this word set, the term "Initial Software Requirements" is generated.

Rule 2: If a word is assigned to the word class Verb, then the term consists of exactly this word.

Rule 3: Applies Rule 1 and Rule 2. If an ordered sequence of words is separated by a conjunction or a preposition associated to a parameter, a new term containing this separator is generated.

The construction of terms also entails to establish a reference to normalized lexical entries. In early stages of semantic annotation, the $KB_{Lex}$ is only bootstrapped with initial entries. This implies that a query for a word or for a term delivers in most cases an empty result set. In such a case, the lexicon must be populated with new entries.

Figure 10:
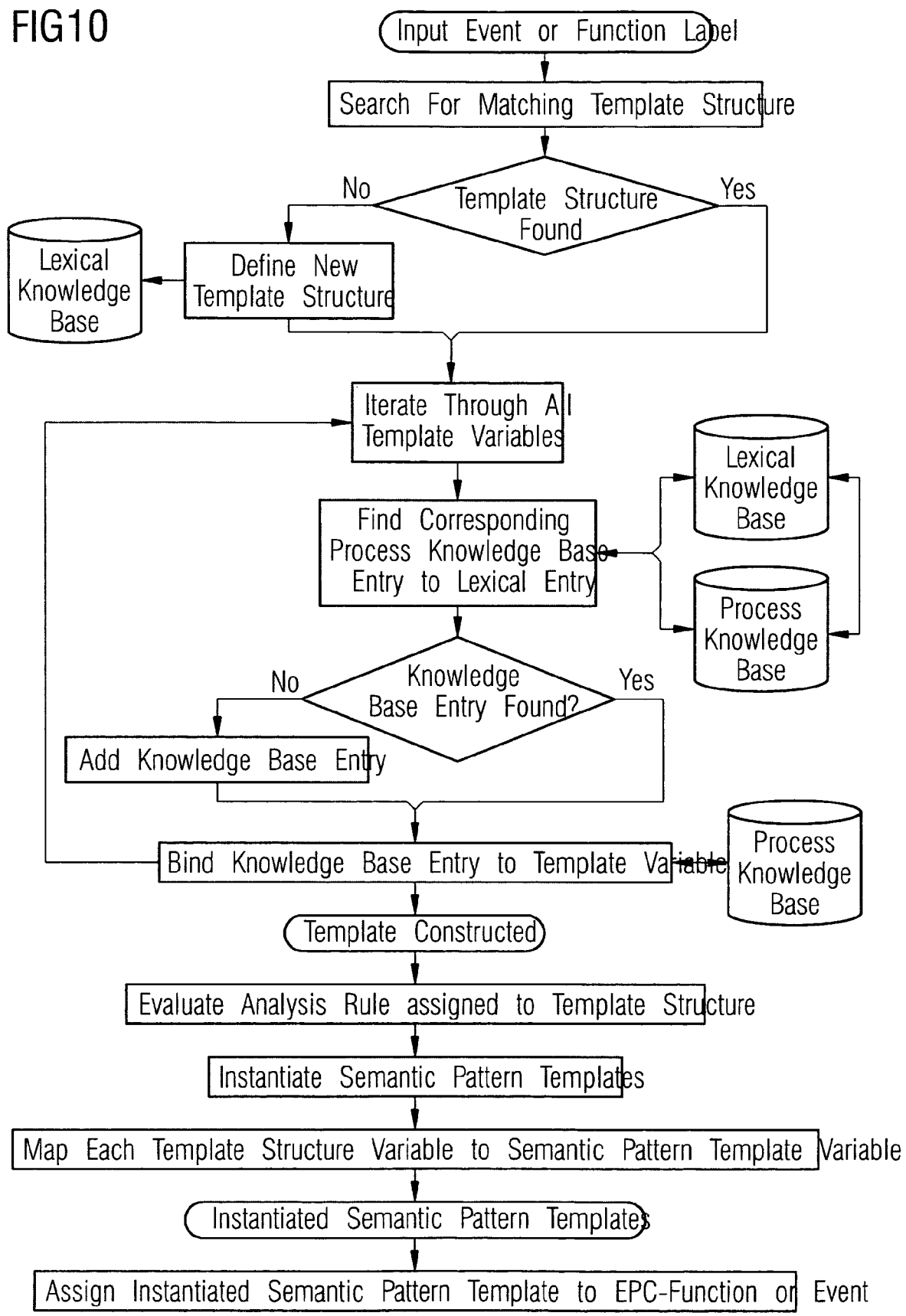
FIG. 10 shows a further flow chart for generation of instantiated semantic pattern templates as performed by a method according to the present invention.

FIG. 10 depicts the steps of a procedure performed by the Semantic Pattern Analyzer 2. Input is a label L for an EPC-Function or Event extracted by the Term Normaliser 3. Based on this label L, the Semantic Pattern Analyzer 2 generates an ordered set of n-tuples containing instances of semantic pattern templates by using analysis rules for a certain semantic pattern description 6.

An analysis rule is specified by a precondition and a body separated by a "→". The precondition consists of the operator MATCH; the body comprises the operator GENERATE. The operator MATCH compares the term structure U of a label L with a predefined template structure f associated to a semantic pattern template.

A matching between a term structure U and a predefined template structure T is a similarity σ:U×T→[0,1] where
 φ($u_1$∈U) is a function that determines the concept $c_{Pro}$ a concept $c_{Lex}$ of $u_1$ is mapped to,
 φ($v_1$∈T) is a function that determines the concept $c_{Pro}$ of a variable $v_i$, $$\sigma(U,T) := \begin{cases} 1 & \forall i = (1,\ldots,n): \varphi(u_i) = \varphi(v_i) \\ 0 & \text{otherwise} \end{cases}$$

The match operator aims at finding a corresponding template structure for a given term structure extracted by the Term Normaliser 3. The two structures match if and only if the mapping of each concept φ($u_i$∈U) with the index i of the term structure is equal to the concept $KB_{Pro}$ variable of φ($v_i$∈T) refers to with the index i.

Figure 11:
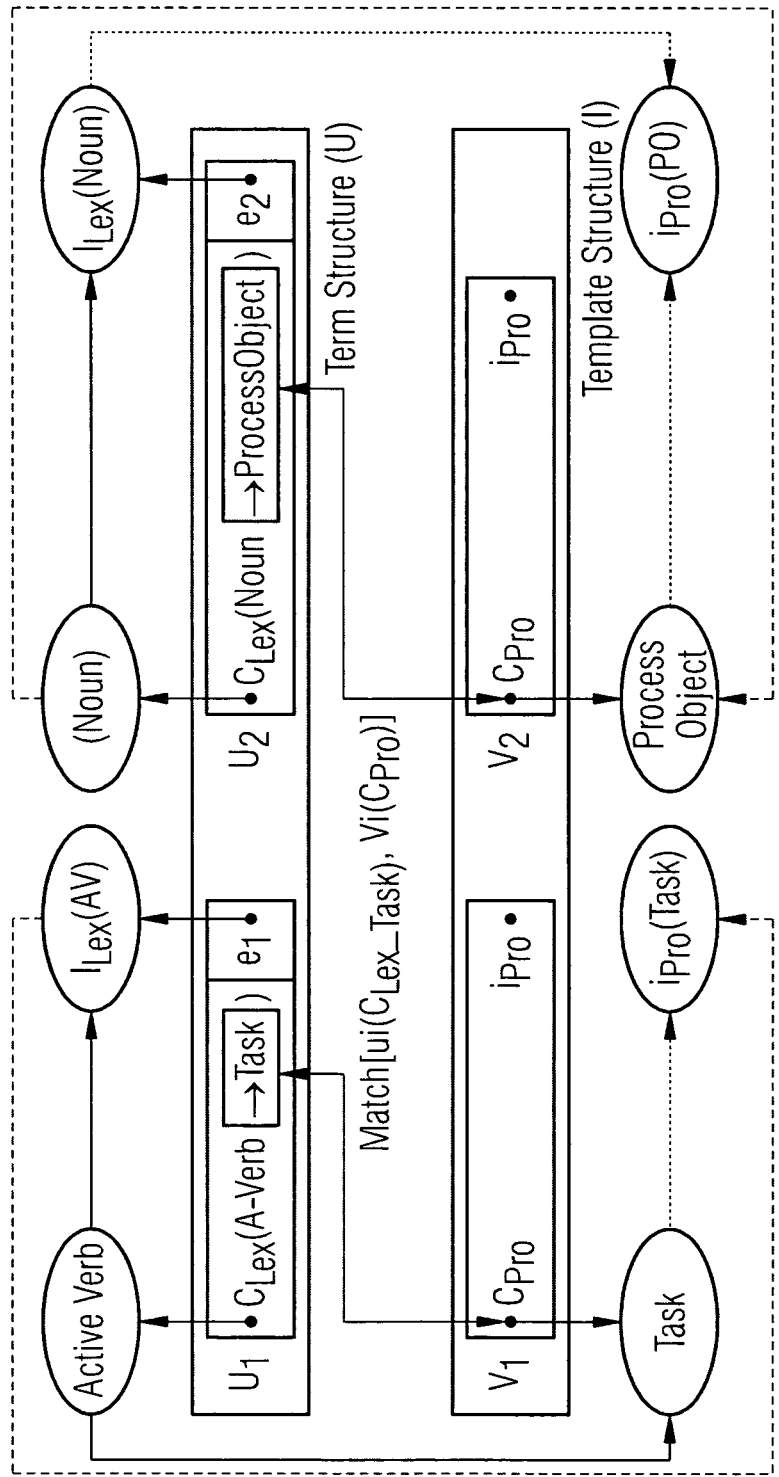
FIG. 11 illustrates the matching between a term structure and template structure as employed by the method an apparatus according to the present invention.

The term structure shown in the example of FIG. 11 comprises the two terms $e_1$ and $e_2$ each pointing to a lexicon entry ($I_{lex}$). A lexicon entry is mapped to an entry of the process knowledge base. This assumes that a corresponding process knowledge base entry for a lexicon entry does exist. Further, each element of the term structure also refers to a lexicon concept $c_{Lex}$ mapped to a concept $c_{pro}$ of the process knowledge base (e.g. $c_{Lex}$(AVerb$_{\to Task}$). The template structure comprises the two variables $v_1$ and $v_2$, each having references to process knowledge base concepts $C_{pro}$. The two structures match if and only if each element of those structures with the index i have a reference to an equal process knowledge base concept $C_{pro}$.

If a corresponding template structure for a given term structure has been identified, the operator GENERATE instantiates an ordered n-tuple of semantic pattern templates $I_T$ whose variables are bound to knowledge base entries.

Instantiation of Semantic Pattern Templates:

The operator GENERATE generate(D,L,T):T→($I_T$) has the three parameters Application Domain D, Label L and a corresponding template structure 7. The instantiation of semantic pattern templates comprises the two tasks (1) binding knowledge base references to each template variable φ($v_i$∈T) of the template structure T and (2) evaluation of the analysis rules assigned to the template structure f. The ordered n-tuple of semantic pattern templates results from evaluating the rules associated to a template structure (e.g. If (MATCH (U, T($v_1$, $v_2$, $v_3$))→GENERATE ({$S_1$($v_1$, $v_2$), $S_2$($v_1$, $v_3$)}))

Figure 12:
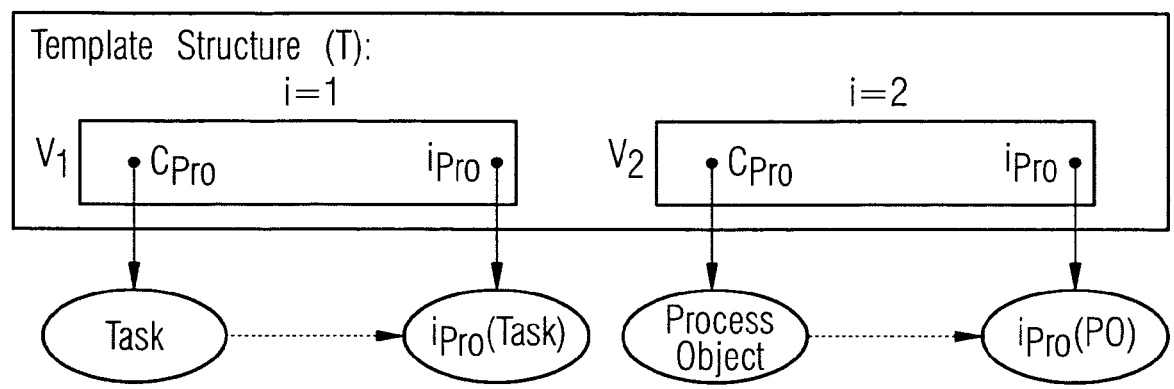
FIG. 12 illustrates the binding of template variables as performed by the method an apparatus according to the present invention.

Binding Knowledge Base References to Template Variables:

The operator GENERATE sets a value for each variable of a matching template structure T. The binding of a variable means a reference to a knowledge base entry (see FIG. 12). The binding value for a variable $v_i$∈T is determined by corresponding $C_{pro}$ concepts between an element with the index i of the term structure and the variable vi with the index i. The index i denotes the term index of a term $e_i$∈{$e_1$, ..., $e_n$} that points to an lexical entry $i_{lex}$. The lexical entry has a mapping to a corresponding $i_{pro}$ entry. Finally, the $i_{pro}$ entry denotes the binding value for the variable $v_i$.

For example U:={[$u_1$($c_{Lex}$(AVerb$_{(\to C^{Pro}(Task))})$)],[$u_2$($c_{Lex}$(Noun$_{\to C^{Pro}ProcessObject})$))]} is a term structure for the terms {$t_1$="Identify", $t_2$="Requirements"} captured by the label L for an EPC-Function. The operator Match identifies the template structure T:={[$v_1$($c_{pro}$(TA),$i_{Pro}$(?))],[$v_2$($c_{Pro}$(PO),$i_{pro}$(?))]} as a corresponding template for the term structure U. After the binding of knowledge base references, the template structure has following values for its variables: $v_1$($C_{Pro}$(TA), $i_{Pro}$ ("Identify")) and $v_2$($C_{Pro}$(TA),$i_{Pro}$("Identify"))

Evaluation of Analysis Rules:

Each template structure has an analysis rule assigned that specifies the number of instances of semantic pattern templates being instantiated. Further, an analysis rule defines how each bound variable of a template structure is mapped to an instance of a semantic pattern template.

Reconsider the analysis rule If(MATCH(U, T($v_1$, $v_2$, $v_3$))→GENERATE ({$S_1$($v_1$, $v_2$), $S_2$ ($v_1$, $v_3$)})) which specifies the instantiation of two semantic pattern templates $S_1$ and $S_2$ and its involved variables. Based on this rule the semantic pattern template $S_1$ consists of the bound variables $v_1$ and $v_2$, the semantic pattern template $S_2$ of the variables $v_1$ and $v_3$. Finally, each instantiated semantic pattern template is assigned to an EPC-Function or Event as depicted in FIG. 6.

The method for a semantic annotation according to the present invention enables to formalize automatically the semantics implicitly captured by names used to describe Functions and Events. Formalization ensures that the meaning of these names can be understood by computer systems. As a consequence, the introduced method transforms semi-formal models to a fully fledged formal representation since semi-formal models are only limited suitable for automated semantic analysis.

The process knowledge base 4B and lexical knowledge base 4A provides concepts and relations that enable to capture the semantics implicitly involved in names. Further, the separation between textual and semantic representation yields the advantage that a process knowledge base entry may have several textual counterparts, such as different languages. This is achieved by assigning each process knowledge base entry a unique identifier.

A semantic linkage is realized by the specification of semantic pattern descriptions 6. They represent a flexible, generic mechanism due to the declarative specification of naming conventions. Based on the definition of an arbitrary set of naming conventions expressed by semantic pattern templates and associated analysis rules, the method is universally applicable. This means that semantic pattern descriptions may not only be defined for names used to describe EPC-Functions or Events, they can be specified for each system that uses any kind of a structured text that should be semantically annotated.

The method and apparatus according to the present invention provides concepts and relations of a knowledge base for capturing the semantics implicitly captured by functions and event names. The lexical knowledge is separated from the process knowledge. EPC function consists in general of a task that is performed on a process object. Each of these model elements has a lexical representation in a certain language such as English or German. Further, a task or a process object having an equal semantics may have different names by using abbreviations or synonyms. Task and process objects are not isolated entries within the knowledge base.

The method and apparatus according to the present invention realize a semantic linkage between EPC functions and events to entries of the knowledge base. Each semantically annotated EPC function and event has several links to knowledge base entries.

The method apparatus according to the present invention automate the semantic annotation of EPC functions and events of a process model. This provides an important advantage since the human driven semantic annotation denotes a tedious, cumbersome task that may result easily in a knowledge acquisition bottleneck.

The method apparatus according to the present invention allow to extract automatically entries for a knowledge base from function and event names of a process model and to establish a semantic linkage of these knowledge base entries.

The invention claimed is:

1. A method for automatic semantic annotation of a process model which comprises model elements named by natural language expressions, the method when processed by a processor performs:
   receiving a process model comprising model elements named by natural language expressions;
   analyzing via a computer processor a textual structure of each natural language expression based on predefined semantic pattern descriptions by searching a reference process ontology comprising a lexical knowledge base and a process knowledge base, such that when a matching entry is not found in the lexical knowledge base, populating the lexical knowledge base with new entries, and when a process knowledge base entry is not found, adding the process knowledge base entry to the process knowledge base;
   establishing via a computer processor a semantic linkage between each model element to classes and instances of the reference process ontology stored in a memory;
   generating via a computer processor a semantically annotated process model of the received process model based on the semantic linkage;
   outputting the semantically annotated process model.

2. The method according to claim 1,
   wherein the reference process ontology is formed by the lexical knowledge base comprising a vocabulary used for model elements and the process knowledge base comprising process semantics of model elements, and wherein the lexical knowledge base is decoupled from the process knowledge base with a mapping established between the lexical knowledge base and the process knowledge base based on predefined rules for naming conventions expressed by patterns found in common naming conventions for model elements.

3. The method according to claim 1,
   wherein the process model is formed by an EPC (event process chain) model, an UML (unified model language) model or a Petri network.

4. The method according to claim 1, wherein each semantic pattern description comprises
   a semantic pattern template of a model element,
   a set of template structures, and
   a set of analysis rules.

5. The method according to claim 4, wherein a semantic pattern template is formed by
   a domain name, and
   an ordered tuple of variables each pointing to a class of said process knowledge base within the reference process ontology and to an instance of said class.

6. The method according to claim 4, wherein the template structure is formed by
   a unique identifier, and
   an ordered tuple of variables each pointing to a class of said process knowledge base within said reference process ontology and to an instance of said class.

7. The method according to claim 4, wherein an analysis rule is formed by
   a precondition which compares template structures with term structures extracted from natural language expressions, and
   an operator that generates one or several instances of semantic pattern templates which are assigned to a model element of said process model.

8. The method according to claim 1, wherein a named process element comprises:
   a function provided for performing a task on a process object to transform said process object from an initial state to a resulting state, or
   an event comprising a text clause.

9. The method according to claim 1,
   wherein for each named model element of said process model a linguistic normalization of its natural language expression is performed by a term normaliser to generate a semantic label of said model element.

10. The method according to claim 9,
    wherein a semantic pattern analysis of each generated semantic label is performed by a semantic pattern analyser to generate an ordered set of tuples containing instances of semantic pattern templates by using analysis rules of a semantic pattern description.

11. The method according to claim 10,
    wherein said instantiated semantic pattern templates are assigned to the respective model element to generate said semantically annotated process model.

12. A computer program product stored in a tangible computer readable medium, when executed by a processor performs the method according to claim 1.

13. An apparatus for automated semantic annotation of a process model having model elements named by natural language expressions, comprising:
    an input interface that receives the process model;
    a reference process ontology stored in memory comprising a lexical knowledge base and a process knowledge base;
    a computer processor adapted to:
    a) analyze a textual structure of each natural language expression based on predefined semantic pattern descriptions by searching the reference process ontology, such that when a matching entry is not found in the lexical knowledge base, populating the lexical knowledge base with new entries, and when a process knowledge base entry is not found, adding the process knowledge base entry to the process knowledge base;
    b) establish a semantic linkage between each model element to classes and instances of the reference process ontology stored in a memory;
    c) generate via a computer processor a semantically annotated process model of the received process model based on the semantic linkage; and
    an output interface that outputs the semantically annotated process model.

14. The apparatus according to claim 13,
    wherein the lexical knowledge base comprises a vocabulary used for model elements, and the process knowledge base comprises process semantics of model elements, and wherein the lexical knowledge base is decoupled from the process knowledge base with a mapping established between the lexical knowledge base and the process knowledge base based on predefined rules for naming conventions expressed by patterns found in common naming conventions for model elements.

15. The apparatus according to claim 13,
wherein said process model comprises an EPC (event process chain)-model, a UML (unified model language)-model or a Petri network.

\* \* \* \* \*